US006025928A

United States Patent [19]

Takemura et al.

[11] Patent Number: 6,025,928

[45] Date of Patent: Feb. 15, 2000

[54] SHUTTLE TYPE RECORDING APPARATUS

[75] Inventors: Makoto Takemura; Shinji Kanemitsu; Hiromitsu Hirabayashi, all of Irvine, Calif.; Yuji Akiyama, Yokohama; Miyuki Fujita, Tokyo, both of Japan; Akitoshi Yamada, Irvine, Calif.

[73] Assignee: Canon Kabushiki Kaisha, Tokyo, Japan

[21] Appl. No.: 08/901,836

[22] Filed: Jul. 28, 1997

[30] Foreign Application Priority Data

Jul. 30, 1996 [JP] Japan .................................... 8-200500

[51] Int. Cl.$^{7}$ .............................. G06F 15/00; H04N 1/00

[52] U.S. Cl. ........................... 358/1.3; 358/401; 358/502; 358/1.4; 358/1.8

[58] Field of Search .................................... 395/109, 106, 395/111, 103, 114; 358/518, 526, 532, 503, 502

[56] References Cited

U.S. PATENT DOCUMENTS

| | | | |
|---|---|---|---|
| 4,272,771 | 6/1981 | Furukawa | 346/75 |
| 5,151,716 | 9/1992 | Kanemitsu | 346/140 R |
| 5,521,623 | 5/1996 | Dochovna | 347/74 |
| 5,682,504 | 10/1997 | Kimura | 395/104 |
| 5,696,890 | 12/1997 | Geissler | 395/109 |
| 5,726,692 | 3/1998 | Yamaguchi | 347/23 |
| 5,784,078 | 7/1998 | Furuya | 347/14 |

FOREIGN PATENT DOCUMENTS

| | | | |
|---|---|---|---|
| 50-81437 | 7/1975 | Japan | G06K 15/00 |
| 1-221251 | 9/1989 | Japan | B41J 3/04 |
| 5-50614 | 3/1993 | Japan | B41J 2/30 |
| 5-124192 | 5/1993 | Japan | B41J 2/05 |
| 5-338273 | 12/1993 | Japan | B41J 3/54 |

*Primary Examiner*—Jerome Grant, II

*Attorney, Agent, or Firm*—Fitzpatrick, Cella, Harper & Scinto

[57] ABSTRACT

In a recording apparatus for recording on a recording medium by using a plurality of recording heads arranged at a predetermined interval in a scan direction, the recording heads are caused to scan corresponding divided recording areas. When the recording heads are caused to scan the corresponding divided recording areas, at least one of the recording heads is caused to record in a plurality of different recording areas. Positions of a recording medium are defined at a plurality of reference positions provided for the recording areas in which the recording is made.

28 Claims, 19 Drawing Sheets

SHUTTLE TYPE RECORDING APPARATUS

BACKGROUND OF THE INVENTION

1. Field of the Invention

The present invention relates to a shuttle type recording apparatus for recording characters and images on a recording medium while scanning a recording head against the recording medium. More particularly, the present invention relates to a serial type recording apparatus in which a plurality of recording head arranged at a predetermined interval can record divided recording areas for the respective recording heads.

The present invention is particularly suitable for a recording apparatus for recording by applying coloring agent on the recording medium in accordance with image data, and it is more particularly suitable for an ink jet type recording apparatus in which liquid recording ink is discharged as the coloring agent to make a record.

The present invention is applicable to any equipment which uses the recording medium such as paper, cloth, skin, unwoven cloth or OHP sheet and further metal or the like. Specific application equipments include office products such as a printer, a copying machine and a facsimile machine and industrial manufacturing machines.

2. Related Background Art

The serial type recording apparatus in which recording is made while scanning the recording head has been commonly used in various recording apparatus because it is less expensive than a recording apparatus in which recording is made by using a full line head which covers an entire width of the recording medium.

In the serial type recording apparatus, a material which reacts to a heat generation element of a thermal head to a dedicated thermal sheet and a material which cause a dedicated photo-sensitive sheet to optically generates a recording color have been known as the material to generate color of the coloring agent to the recording material. As a system to make a record by applying the coloring agent to the recording material by the recording head, various systems have been put into practice and proposed. For example, an impact recording system in which an ink ribbon having liquid ink impregnated as the coloring agent is pressed and abutted against the recording medium by a print wire to transfer the ink, a thermal fusion transfer recording system or a thermal sublimation system in which a heat generating element of a thermal head is reacted to an ink ribbon head having a solid coloring agent applied to transfer the ink and an ink jet system in which liquid recording ink is discharged to make a record.

Recently, from a stand point of plain sheet recording, the latter recording system for applying the coloring agent is main stream. Among them, the ink jet recording system has advantages of low noise, low running cost, easiness to make the apparatus compact, ability of plain sheet recording and easiness for color recording, and has been commonly used in the recording apparatus such as a printer and a copying machine.

In the serial type recording apparatus, recording heads each of which allows the recording only in a relatively small limited area of the recording element such as a discharge port provided in the recording head are arranged on a carriage and they are sequentially scanned to make a record. Thus, it is relatively difficult to increase a recording speed and the increase of the recording speed has been a problem for the serial type.

On the other hand, in order to increase the speed of the image recording, it has been proposed and put into practice to increase a recording width (arrangement range of recording elements) of the recording head, to increase the carriage speed and a recording frequency to reduce a scan time or to scan bilaterally to make a record. However, each system has limitation. For example, in order to increase the recording width, corresponding improvement of precision in manufacturing the head is required and the recording head becomes expensive and a capacity of print buffer for temporarily storing the record data increases so that a problem is raised in terms of cost. In the system in which the color is generated by utilizing heat or the coloring agent is applied, means for preventing the deterioration of the recording quality or the break of the head due to self-temperature-rise of the recording head is needed particularly when the recording width is large. In the ink jet recording system in which the liquid recording ink which is not in contact with the recording medium, when a recording head of a large recording width, means to prevent the deterioration of the recording quality due to cockling of the recording medium by absorption of moisture of the ink is complex. When the recording frequency is raised, it is necessary to increase the scan speed of the carriage to maintain a certain pixel density, but in this case, a load of a drive source increases and the recording quality may be deteriorated by vibration of the ink in the recording head due to the high speed of the carriage.

A system which is relatively effective to increase the speed of the serial type image recording apparatus is disclosed in JP-A-50-81437 and U.S. Pat. No. 4,272,771. This reference discloses that, in order to concurrently print on a left half and a right half of a print line, a left print head assembly and a right print head assembly supported by one carriage mechanism are used to attain the speed-up of approximately two times. It also teaches that a higher recording speed may be attained by increasing the number of print head assemblies to more than two or conducting the bilateral printing.

However, the prior art disclosed in the reference, in most cases, divides the recording areas merely from a stand point of high speed of recording. Accordingly, a construction which positively considers an overlapping recording area duplicatedly scanned by a plurality of heads is not disclosed. From a view point of high speed recording, it teaches that the overlapping recording area should be excluded as much as possible. Such overlapping recording area is not utilized as a recording area which is different from the recording area comprising divided recording areas.

As an application of the above, the recording in an area which is a combination of divided recording areas of several recording heads and the recording for a recording medium fed to various locations (positions) with various sizes may be used.

When such recording areas various sizes and positions are used, it is preferable that the apparatus is properly constructed. It is also preferable that the size of the recording apparatus does not increase in spite of the capability of recording on a recording medium of a relatively large size.

In order to attain the above, it is necessary to consider a reference position when recording sheets of various sizes are fed. Further, in order to make the apparatus compact while using the recording sheet of a large size, it is necessary to make the movement range of the carriage to be substantially equal to the recording area while securing the recording area by the divided recording areas corresponding to the large size.

Further, in such a case, it is preferable to consider the arrangement position of a maintenance unit for the recording head which does not directly relate to the recording. It is particularly preferable to consider the arrangement position in connection with the reference position of the recording sheet.

As the maintenance unit of the recording head, in the ink jet recording system, a mechanism for recovering the discharge to solve a problem due to the use of liquid ink has been known. For example, as means for cleaning out foreign materials such as droplets and paper powder deposited on the discharge port surface by the jump-back of ink mist or ink droplets from the recording medium, a construction to wipe the discharge port surface by a blade (wiper) formed by an elastic member such as rubber has been commonly adopted. Further, a cap is applied to the discharge port surface during non-record mode to prevent the evaporation of the ink in the recording head and the increase of viscosity and solidification of the ink. When the increase of viscosity or the solidification occurs and the discharge fails or the foreign materials on the discharge port surface cannot be removed by the blade, the high viscosity ink in the discharge port is ejected by a suction pump linked to the cap to recover normal discharge.

Further, in the recording operation of an on-demand type ink jet recording system, all of a plurality of discharge ports provided in one head are not always used and there are non-use discharge ports which are not used for certain time period. When a plurality of recording heads are provided such as in a color recording apparatus, all of the recording heads may not be used when record data is not transferred (no recording). If the carriage is scanned or stopped while the discharge port surface is not capped, the ink on the discharge port surface and in the discharge ports to which the inks are not continuously supplied for certain time are evaporated and dried, and the discharge performance and the record image quality are lowered. In the construction for making the records in various recording areas by using a plurality of recording heads as described above, there may be a head which does not discharge the ink depending on the recording area and it is preferable to consider the countermeasure to the failure of discharge caused thereby.

Together with the above recovery unit, it has been commonly conducted to discharge the ink at a predetermined position at a predetermined time interval without regard to the record data to eject the ink in the discharge port to keep the ink fresh so that the proper discharge condition is always kept. Such ink discharge operation is known as preliminary discharge. The discharged ink by the preliminary discharge is usually discharged toward the cap in the recovery unit or separately provided preliminary discharge receptacle to prevent the scatter to the recording medium and the inside of the recording apparatus.

SUMMARY OF THE INVENTION

It is an object of the present invention to provide a recording apparatus having a construction to make a record in divided recording areas by a plurality of heads which allows proper recording in the recording areas of various sizes and positions.

It is another object of the present invention to provide a recording apparatus which allows proper setting of a recording position of a sheet and protection of a recording head.

It is another object of the present invention to provide a recording apparatus which, when applied to an ink jet recording system having a plurality of heads, allows proper setting of arrangement position of a recovery unit of the recording apparatus in connection with various recording areas.

In order to achieve the above object, in accordance with one aspect of the present invention, there is provided a recording apparatus for recording on a recording medium by using a plurality of recording heads arranged at a predetermined interval in a scan direction comprising scan means for causing the recording heads to scan corresponding divided recording areas, record control means for causing at least one of the recording heads to record in a plurality of different recording areas when the scan means causes the recording heads to scan the corresponding divided recording areas, and definition means for defining positions of a recording medium at a plurality of reference positions provided for the recording areas in which the recording is made by the record control means.

In accordance with another aspect of the present invention, there is provided a recording apparatus for recording on a recording medium by using a plurality of recording heads arranged at a predetermined interval in a scan direction comprising scan means for causing the recording heads to scan corresponding divided recording areas, record control means for causing at least two of the recording heads to record in a first record mode to record a maximum recording area by share recording in the divided recording areas and in a second record mode to record an overlapping recording area in which the recording heads record in an overlapped manner by cooperation of at least two recording heads, when the scan means causes the recording heads to scan the corresponding divided recording areas; and definition means for defining positions of a recording medium at a plurality of reference positions provided for the maximum recording area in which the record is made and the overlapping recording area.

In accordance with the present invention, since the reference position for feeding the recording medium is determined for each recording area, proper recording may be attained in the recording areas of various sizes or positions. Even if a home position of the head is provided in the recording area, it is provided on the opposite side to the reference position so that the head at the home position is located beyond the range of the recording medium when the recording medium of a small size is used, and even if the sheet jams, the break of the head thereby can be prevented.

Further, since the reference position is provided on the record start side, a constant margin is produced even if an error is included in the dimension of the recording medium.

Further, since the position reference member is movable at a pitch not larger than an arrangement pitch of the heads, the reference position can be readily determined for the recording areas of various sizes.

As a result, high speed, high precision recording is attained for the recording media of various sizes. In the medium transport system having a plurality of recording medium paths, the operability to set the sheets is improved and the reliability is improved by the head protection.

DESCRIPTION OF THE PREFERRED EMBODIMENTS

The embodiments of the present invention are now explained in detail with reference to the drawings.

[First Embodiment]

Figure 1:
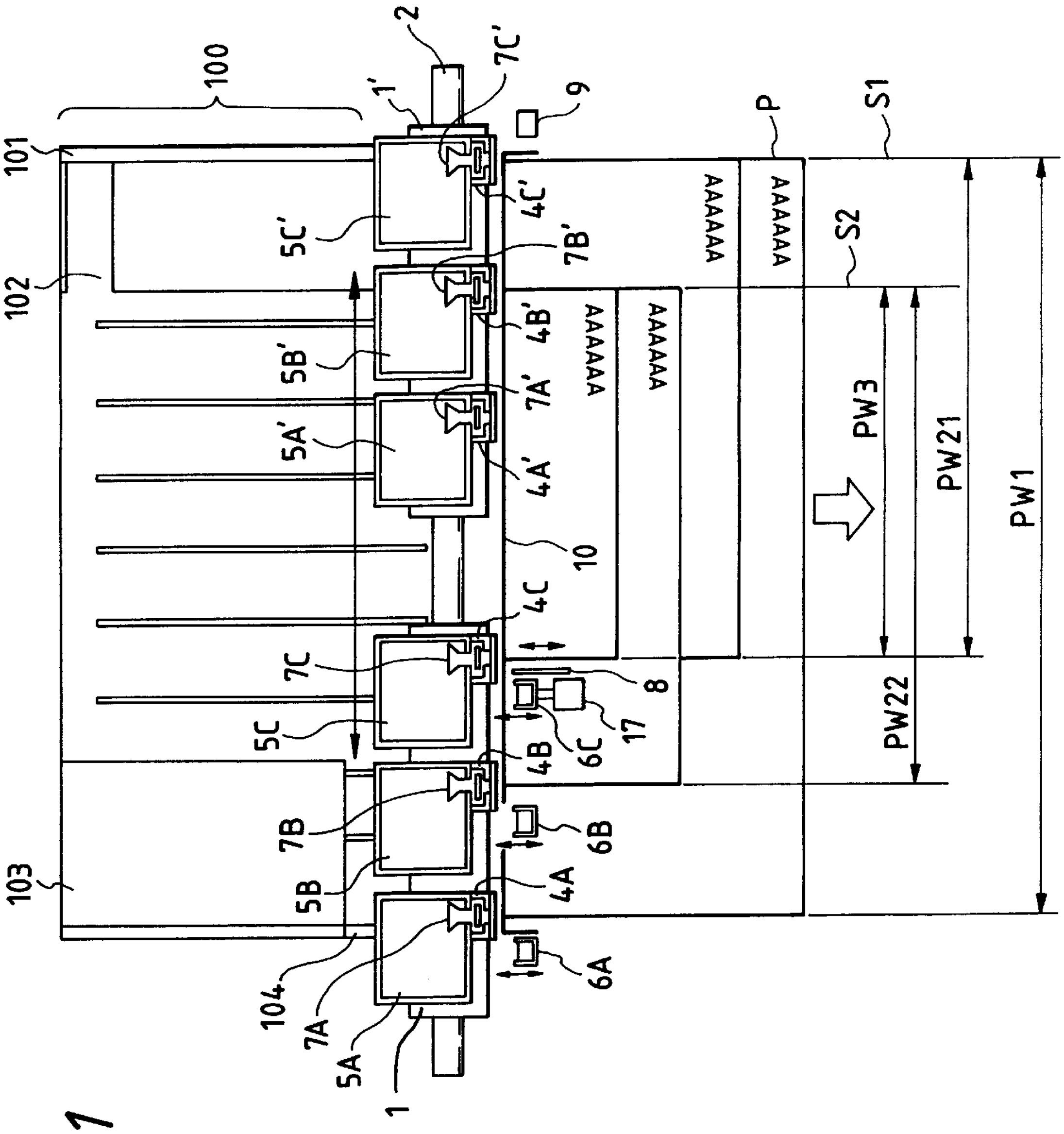
FIG. 1 shows a schematic front view of major portions of an ink jet recording apparatus in accordance with a first embodiment of the present invention.
Figure 2:
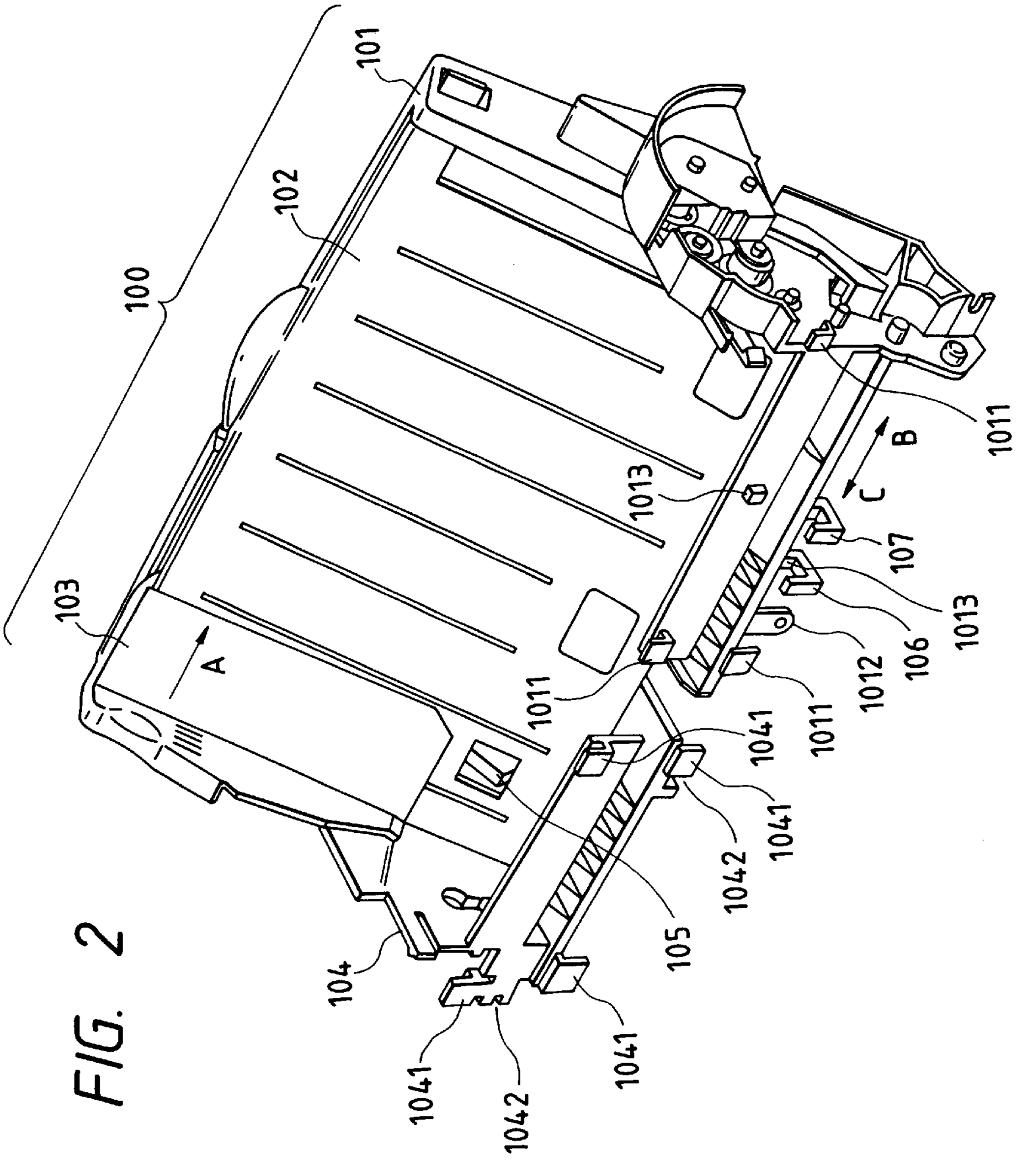
FIG. 2 shows a perspective view of a sheet feed unit used in the first embodiment.
Figure 3:
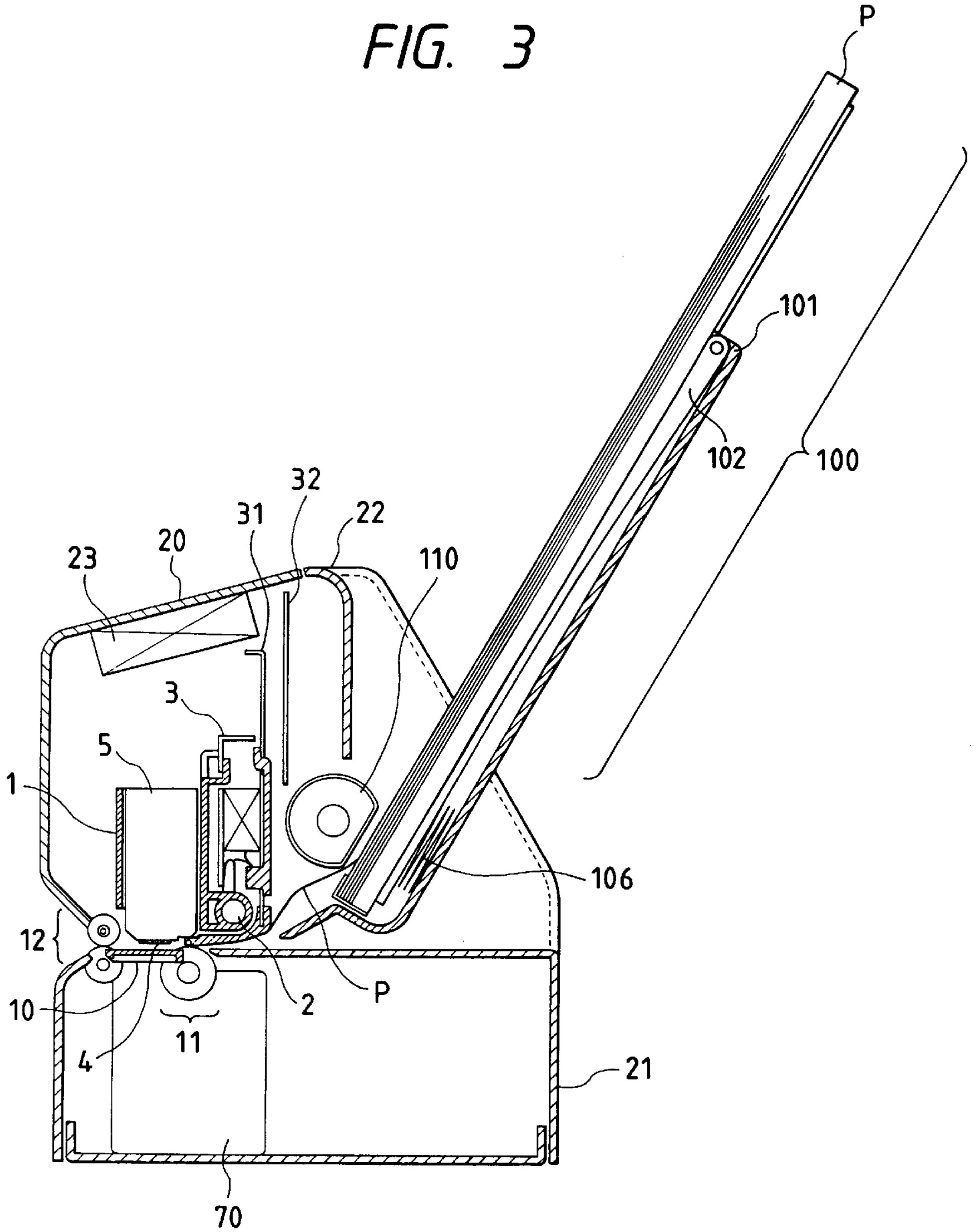
FIG. 3 shows a sectional view for illustrating sheet feed position switching in the sheet feed unit of the first embodiment.

FIG. 1 shows a schematic front view of a construction of the ink jet recording apparatus in accordance with a first embodiment of the present invention and it shows two positions of recording heads. FIG. 2 shows a perspective view of a sheet feed unit used in the above apparatus and FIG. 3 shows a sectional view of the recording apparatus.

In those figures, a record sheet P as a recording medium loaded to a sheet feed position of the recording apparatus is fed to a recordable area of the recording head unit by a feed roller 110. When the sheet is started, it is first fed to the recordable area while it is held by a feed roller pair 11. A platen 10 provided to face the sheet P at the bottom of the recording sheet in the recordable area. After the recording, the recorded area is sequentially ejected out of the apparatus while it is held by a sheet ejection roller pair 12.

The carriage 1 is constructed to be bilaterally movable along a guide shaft 2 and a guide plate 3 with which it engages so that it may reciprocally scan the recording area. Recording heads 4A, 4B and 4C for discharging inks are removably mounted on the carriage 1, and ink tanks 5A, 5B and 5C containing the inks to be supplied to the respective recording heads 4A, 4B and 4C are also removably mounted on the carriage 1. The recording heads 4A, 4B and 4C discharge the inks in accordance with record data to record images while they scan the respective divided recording areas.

Cap units 6A, 6B and 6C as the recovery system are provided at a position beyond a platen 10 extending along the area through which the carriage 1 may move and at left bottom of the platen 10 in the movement area in order to cap the discharge ports of the recording heads during the non-record mode. Those caps are movable forwardly and backwardly to the recording heads. Numerals 7A, 7B and 7C denote ink supply ports for introducing inks into the recording heads 4A, 4B and 4C from the ink tanks 5A, 5B and 5C, respectively.

The construction of the present invention offers a great effect even in monochromatic recording such as black and white. In the present embodiment, color recording using inks of a plurality of colors is explained.

As described above, the head mounted on the carriage 1 is a four-color integrated recording head for discharging black (Bk), cyan (C), magenta (M) and yellow (Y), and the tanks 5A, 5B and 5C each having the inks Bk, C, M and Y to be supplied to the recording heads 4A, 4B and 4C integrated are also mounted as the ink tanks. The tanks 5A and 5C contain high density inks and the tank 5B contains low density ink. Each of the four-color integrated recording heads 4A, 4B and 4C has a resolution of 360 dpi and is constructed such that 64 Bk discharge ports and 24 discharge ports of C, M and Y, respectively, integrally transverse a direction of scan with a separation of eight discharge ports for each color, and they are of identical construction. The heads 4A and 4C discharge the high density ink and the head 4B discharges the low density ink so that a gray level image of high tonality may be recorded by using those heads.

As described above, two cap units 6A, 6B and 6C are provided on the left side of the apparatus and near the center at an interval corresponding to the recording heads 4A, 4B and 4C as one of the maintenance units of the recording heads 4A, 4B and 4C. The cap units 6A, 6B and 6C are vertically movable. Thus, when the recording sheet P is not present on the platen 10 of the recording area and the recording head is positioned at the cap position during the non-record mode, the recording heads 4A, 4B and 4C join the discharge port surfaces, respectively, to cap them. In this manner, the increase of the viscosity due to the evaporation of the inks in the discharge ports of the recording heads 4A, 4B and 4C and the failure of the discharge due to the solidification are prevented. The cap 6C is linked to a pump unit 17 which generates a negative pressure while the recording heads 4A, 4B and 4C and the cap 6C are joined to conduct the suck recovery process.

For the pump unit 17, and one of known cylinder pump or tube pump may be used.

The pump unit 17 may be of any construction such as known cylinder pump or tube pump. Since the cap 6C has functions of forced recovery of the ink as well as the prevention of evaporation, it is not of closed structure but of quasi-atmosphere open structure to link the cap to atmosphere by a porous structure in order to fully suppress the evaporation of the ink and avoid a pressure variation in the cap due to a temperature change.

The pump unit may be provided in other caps 6A and 6B. In the present embodiment, in order to simplify the construction, the pump unit 17 is connected to only the cap 6C near the center as described above. When the pump 17 is linked to only one cap for the three heads, the position of the cap 6A is not scanned by the heads 4B and 4C by the division of the recording area and the position of the cap 6B is not scanned by the head 4C and only position of the cap 6C located in the area which can be scanned by all heads, that is, an overlapping scan area can recover the suck in common.

The left side cap 6A also functions as a preliminary discharge receptacle and like the cap 6B, it is of quasi-atmosphere open structure to link the cap to atmosphere by the porous structure such as the tube in order to fully suppress the evaporation of the ink and avoid the pressure variation in the cap due to the temperature change.

As the maintenance unit of the recording heads 4A, 4B and 4C, a blade 8 for wiping the discharge ports of the recording heads 4A, 4B and 4C are further provided. The blade 8 is formed by an elastic material such as rubber in order to wipe the ink and the treatment liquid attached to the discharge port forming planes of the respective recording heads. The blade 8 is provided in the overlapping scan area of the recording heads 4A, 4B and 4C as is the cap 6C. The blade 8 is used in common by the those recording heads and is vertically movable by an elevator unit, not shown, so that it may assume an up position to wipe the surface of the recording head and a down position at which it does not interfere the surface of the recording head. Three blades 8 may be provided for the three recording heads 4A, 4B and 4C. In the present embodiment, in order to simplify the construction, only one blade is provided near the center so that it acts to the three recording heads 4A, 4B and 4C in common.

As the maintenance unit of the recording head 4C, the preliminary discharge receptacle 9 is further provided on the opposite side to the home position (cap position) which is a stand-by position of the heads in the recording area. The cap 6A and the preliminary discharge receptacle 9 are used to conduct the preliminary discharge by the heads 4A and 4B in order to prevent the change of the discharge characteristic and the change of the color tone due to the evaporation of the ink during the recording or the stand-by.

In this manner, the preliminary discharge receptacle is provided for only the heads 4A and 4C in the area through which the recording sheet P does not pass so that the preliminary discharge may be conducted even during the recording because the heads 4A and 4C discharge the inks of relatively high density and they tend to increase the viscosity. For the head 4B for discharging the low density ink, the preliminary discharge may not be required for certain time period because the density of the coloring material such as the ink dye is low and the degree of increase of viscosity is low.

The ink jet recording head of the present embodiment adopts a recording system in which heat generating elements which are electro-thermal transducers are arranged for the respective ink discharge ports and drive signals corresponding to the record information are applied to the heat generating elements to discharge the inks from the discharge ports.

FIG. 1 shows two positions for the carriage 1. The head 4A is positioned at the left end of a maximum recording area PW1 which is recorded by the sharing by the respective heads of the corresponding divided recording areas and the head 4C is positioned at the right end of that area. (In the drawing, the elements corresponding to this position are designated by reference numerals added with [']). As will be described later, in the present embodiment, the carriage 1 may be moved such that the respective heads scans the range of the maximum recording area PW1 in the record mode and the size of the apparatus may be substantially same size as that while securing the maximum recording are PW1.

The carriage 1 is driven and scanned forwardly and backwardly by a drive belt, not shown and the rotational drive of a motor. As a position detection unit for the carriage 1, the technique to detect the recording head position directly by using a linear encoder of an optical type or a magnetic type or the technique to estimate the position by the count of drive pulses by using a pulse motor may be adopted.

A width dimension of the recording sheet is now explained.

The maximum recording width PW1 is a maximum width of the area attained by recording by the heads 4A and 4C positioned at the opposite ends of the carriage 1, in the corresponding divided recording areas. The feed of the recording sheet in this area is conducted by using a first sheet reference S1 as a reference.

A second recording width PW21 is a maximum width of the area attained by recording the divided recording area by only the recording head 4C by the first sheet reference S1 as the end.

In the present embodiment, a third recording width PW22 having the end at the second sheet reference S2 which is inner of the first sheet reference S1 is provided. It is a maximum width recordable by the recording head 4B for the divided recording areas and a recording width of the overlapping recording area in which the overlapped recording may be made by the recording heads 4B and 4C and the recording heads 4A and 4B. For the recording width PW22, the heads 4A and 4B and the heads 4C and 4B cooperatively make the record. A fourth recording width PW3 is a maximum width recordable by overlapping by the recording heads 4B and 4C, with the second sheet reference being the end.

It is preferable that the sheet widths PW1 and PW2 are determined based on easily available from sizes.

The commonly used sheet sizes are A4 size (sheet width: 210 mm, length: 297 mm), A3 size (sheet size: 297 mm, length: 420 mm), B5 size (sheet size: 182 mm, length: 257 mm), B4 size (sheet size: 257 mm, length: 364 mm), Letter size (sheet size: 8.5") and Ledger size (sheet size: 11"). Recently, by a demand to record the print reference at the opposite ends of the A3 size, a special size having a sheet size of approximately 320 to 340 by expanding both sides by 10 to 20 mm has been used. Of those, the A4 size and the Letter size are particularly used frequently. From such a trend of the sheet size, in the present embodiment, the recording width PW1 is set to the A3 size (sheet width: 297 mm) the recording widths PW21 and PW22 are set to the Letter size (sheet width: 8.5") and the recording width PW3 is set to the A5 size (sheet width: 148.5 mm).

The ink jet recording apparatus of the present embodiment has the first sheet reference S1 corresponding to the maximum recording width and the second sheet reference S2 corresponding to the overlapping record. As seen from FIG. 1, the interval between those sheet references corresponds to the interval between the heads 4B and 4C.

In FIGS. 2 and 3, numeral 31 denotes a chaises for supporting a guide shaft 2, a guide plate 3, a feed roller pair 11, an ejection roller pair 12 and an electrical board 32. The chaises 31 fixedly supports a left base 104 of the sheet feed unit and movably supports a right base 101 which forms the first or second sheet reference.

Numeral 20 denotes an upper cover, numeral 21 denotes a bottom case, numeral 22 denotes a top case and numeral 23 denotes a display unit. Those elements form an outer unit.

FIG. 2 shows a construction of the sheet feed unit 100. The unit 100 is rotatably pivoted on the left and right bases 101 and 104 and has an intermediate plate 102 for supporting the sheet and a left guide 103 movably supported in a direction A on the intermediate plate 102 to regulate the sheet on the opposite side of the sheet reference. The left base 104 engages with the chaises at a projection 1041, and fixed by a screw at a notch 1042. The right base 101 engages with the chaises 31 at a projection 1011 and is supported movably in directions B and C, and the position in the directions B and C to the chaises 31 are determined by the engagement of a spring 1012 having a projection at an end and a hole (not shown) of the chaises 31. Numeral 105 denotes a sheet sensor which determines whether the sheets are mounted on those positions. For example, a reflection type optical sensor for directly determining the presence or absence of the sheet surface or a transmission type optical sensor which uses a mechanical lever and a light shield plate may be used. Numerals 106 and 107 denote base position sensors which use the transmission type optical sensors and they detect the passage of the light shield 1013 on the right base 101 to acquire the current position information of the right base 101.

Figure 4:
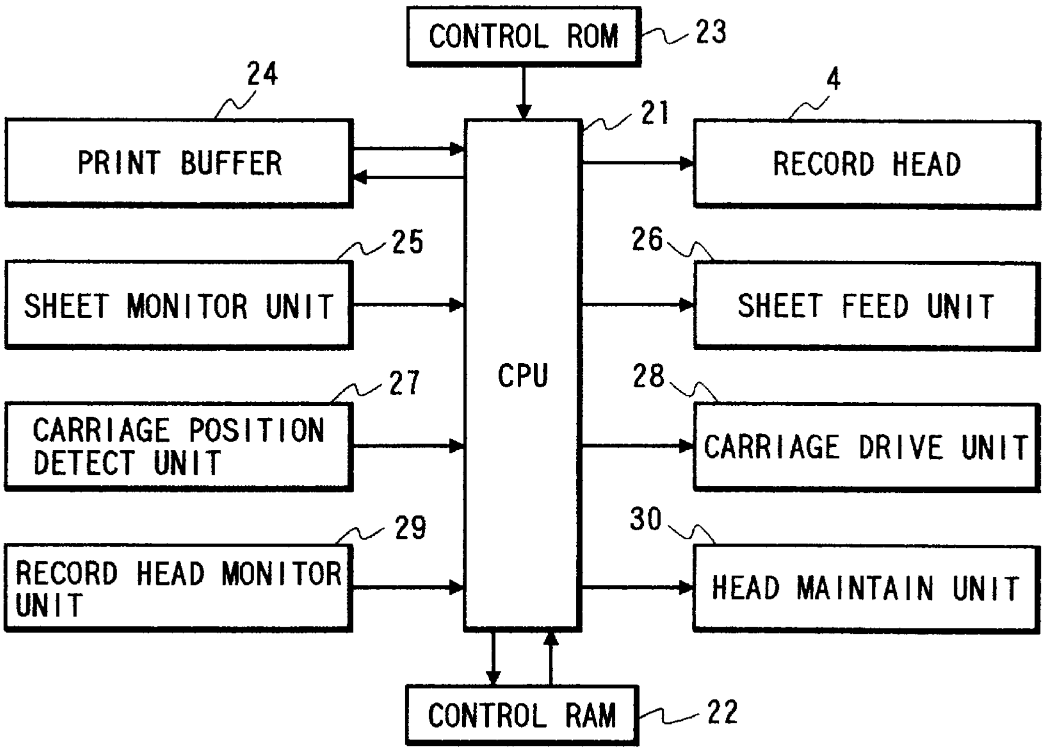
FIG. 4 shows a block diagram of a control unit in the recording apparatus of the first embodiment.

FIG. 4 shows a block diagram of a control unit of the recording apparatus of the present embodiment. As shown therein, characters or images (hereinafter referred to as image data) to be recorded are inputted from a host computer to a reception buffer of the recording apparatus. Data for determining whether data is correctly transferred and data to notify an operation condition of the recording apparatus are transferred from the recording apparatus to the host computer. The data in the reception buffer is temporarily stored in a print buffer (RAM) 24 under control of a CPU 21, a control RAM 22 and a control ROM 23, and it is supplied to the recording apparatus 4A and 4B as the record data. The sheet feed unit 26 drives the sheet feed roller and the line feed roller by controlling a drive source such as a motor by a command from the CPU 21 based on the information of a sheet monitor unit 25. A carriage drive unit 28 drives a carriage drive source by a command from the CPU 21 based on the information of a carriage position detection unit 27. A recording apparatus maintenance unit 30 maintains the recording heads and optimizes the drive condition by a command from the CPU 21 based on the information of a recording apparatus monitor unit 29 comprising sensors for detecting a temperature of the recording apparatus and the presence or absence of the ink.

Figure 5:
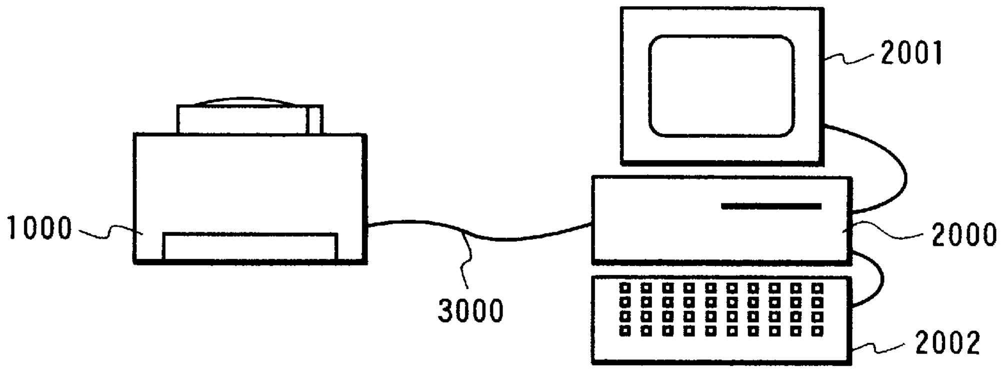
FIG. 5 shows a connection of the ink jet recording apparatus of the first embodiment and a computer.

FIG. 5 shows a system comprising the image recording apparatus in accordance with the present embodiment and a computer as a host unit. Numeral 1000 denotes the image recording apparatus, numeral 2000 denotes the host computer, numeral 2001 denotes a monitor, numeral 2002 denotes a keyboard and numeral 3000 denotes a connection cable. As the information exchanged between the image recording apparatus 1000 and the host computer 2000 thorough the connection cable 3000, as explained in FIG. 4, the image data as well as the information of the recording sheet size are sent from the host computer 2000 and the image recording apparatus 1000 determines the conformity with the sheet size currently loaded in the sheet feed unit 100 derived from the sheet sensor 105.

Figure 6:
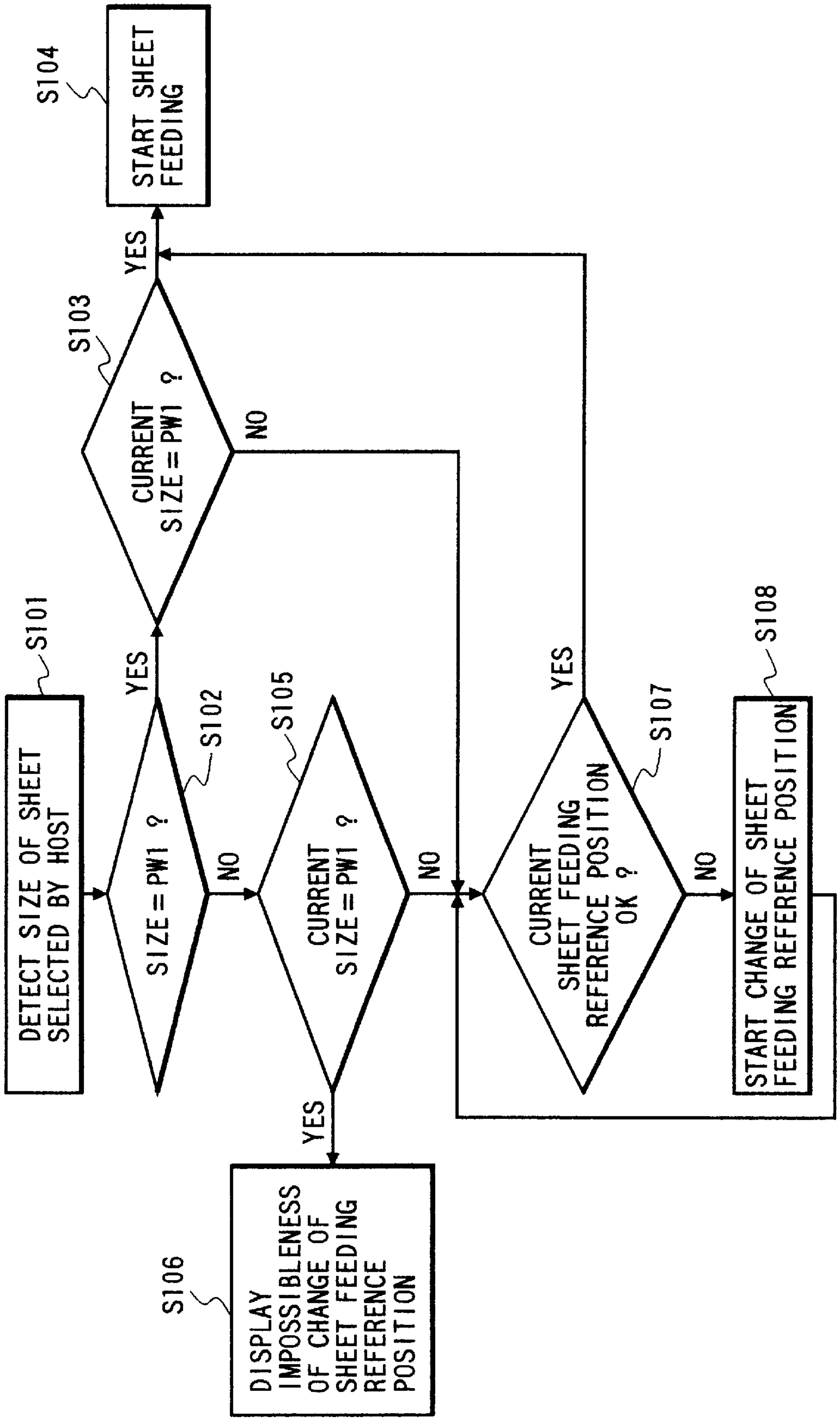
FIG. 6 shows a flow chart of a sheet feed position switching operation of the first embodiment.

Referring to FIG. 6, the switching operation of the sheet reference is explained.

Figure 7:
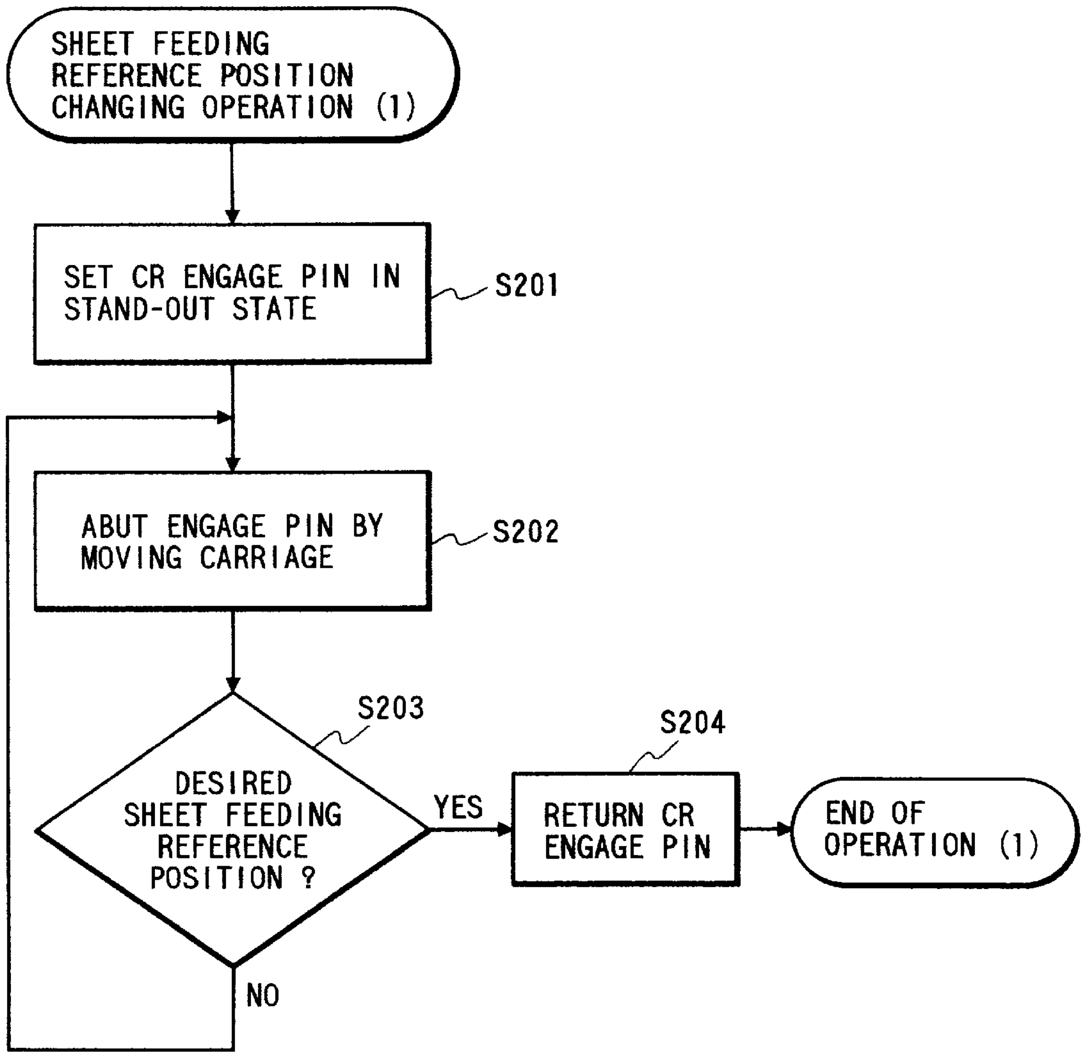
FIG. 7 shows a flow chart of a sheet feed reference switching operation in the sheet feed position switching operation of the first embodiment.

FIG. 6 shows a flow chart the sheet position switching process in accordance with the present embodiment and FIG. 7 shows a flow chart of detail of the sheet feed position switching operation.

In FIG. 6, when the sheet size information selected by the host computer 2000 is detected (S101), whether the size is the maximum recording width PW1 or not is determined (S102). If it is the maximum recording width PW1, it is not possible to move the sheet feed unit 100 beyond it to switch the sheet feed reference. Therefore, it is first determined. If the decision is the recording width PW1, whether the width of the currently loaded sheet corresponds to the recording width PW1 or not is determined by the sheet sensor 105 which is a part of the sheet monitor unit 25 in a step S103, and if it conforms, the sheet feed operation is started (S104). On the other hand, if the step S103 determines that it does not correspond to the recording width PW1, the process proceeds to determination (S107) for changing the reference position.

In the step S102, if the selected sheet width does not correspond to the recording width PW1 but is smaller than that, whether the width of the currently loaded sheet corresponds to the recording width PW1 or not is determined in a step S105, and if it corresponds to PW1, it is not possible to switch the sheet feed and the sheet feed reference switching disabled is displayed (S106). Further, the movement is disabled and the information thereof is transferred to the host computer 2000 which displays it on the monitor 2001 to attract caution of a user. If the step S105 determines that the sheet width is not the recording width PW1, the process proceeds to determination (S107) for changing the reference position.

In the step S107, whether the current sheet feed reference position is conformable or not is determined by the base position sensors 106 and 107. If it conforms, the sheet feed operation is started (S104), and if it does not conform, the sheet feed reference switching operation (S108) is started, and the steps S107 and S108 are repeated until the movement of the right base 101 to a predetermined position is completed.

Detail of the sheet feed reference switching operation is now explained with reference to FIG. 3, FIG. 8 which is a partial enlarged view of FIG. 3 and a flow chart shown in FIG. 7.

Figure 8:
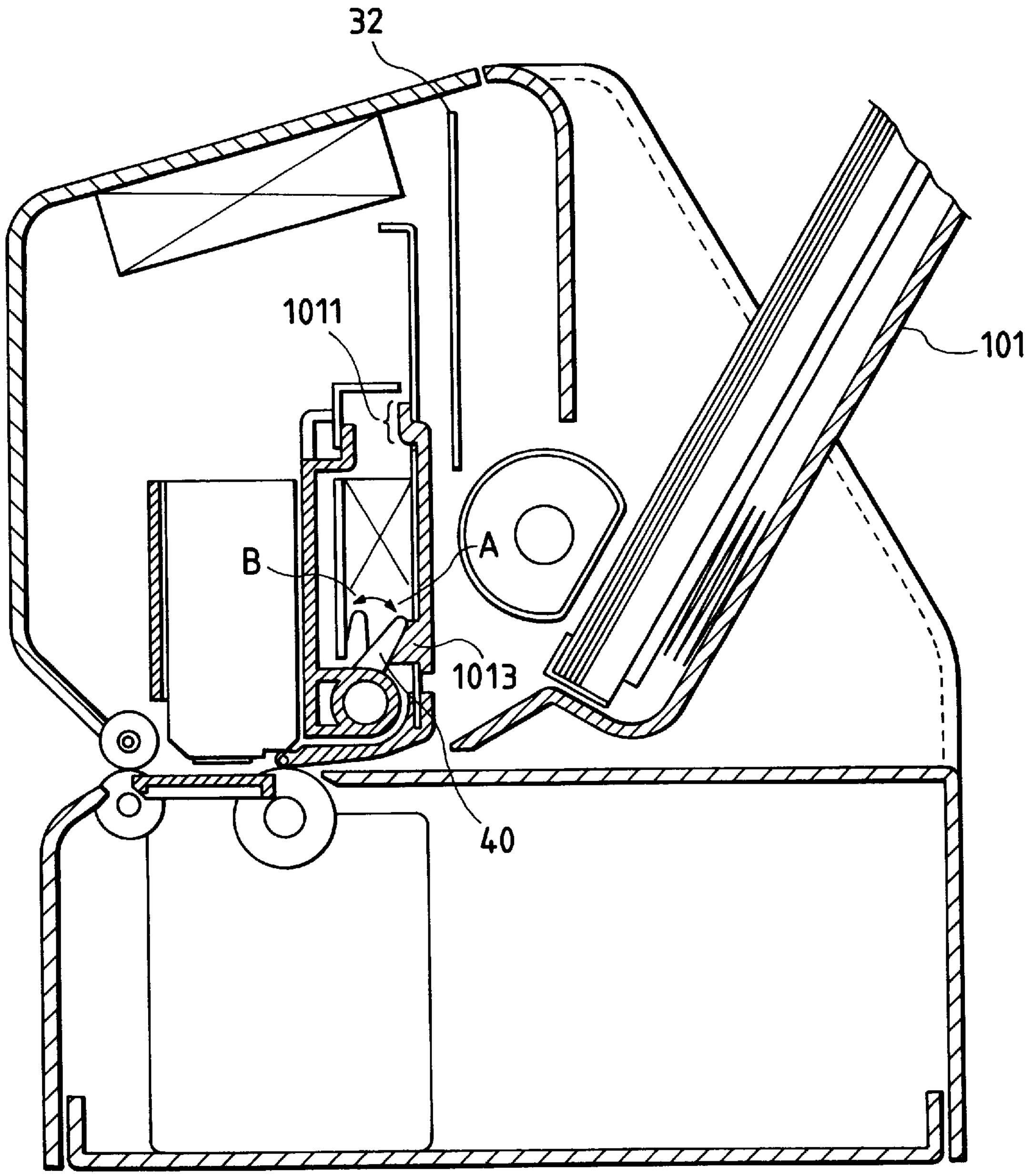
FIG. 8 shows a partial enlarged sectional view for illustrating the sheet feed position switching in the first embodiment.

When the sheet feed reference switching operation (1) is started, a CR engagement pin 40 swingable (by a drive source, not shown) in directions A and B of FIG. 8 relative to the carriage 1 is protruded in the direction A (S201), and it is abutted against a projection 1013 of the right base 101 by the movement of the carriage 1 (S202). Whether the predetermined sheet reference position is reached by this operation or not is determined by the base sensors 106 and 107 (S203). In this manner, when the predetermined position is reached (S203), the CR engagement pin 40 is returned in the direction B (S204) and the switching operation is completed. The projection 1013 is provided at a position engageable or disengageable with the CR engagement pin 40 in the sectional direction. It is supported by the right base 104 and the left base 101 so that the position of the intermediate plate 102 does not change even if the right base 104 is moved.

In the above construction, a difference between the first sheet reference S1 and the second sheet reference S2 is equal to the pitch of the recording heads 4B and 4C although a smaller value may be selected.

The arrangement of the hope position of the carriage 1 is now explained.

Figure 9:
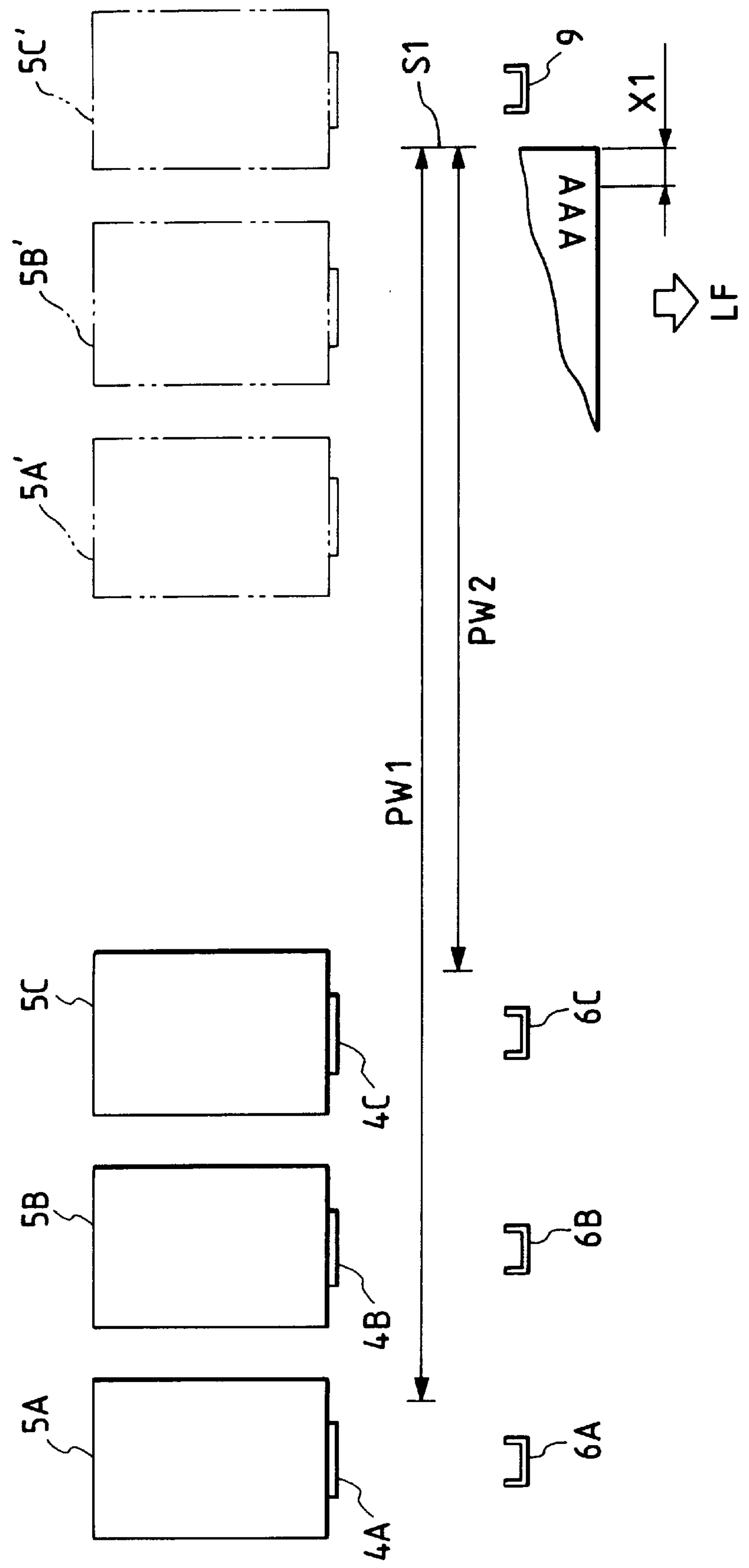
FIG. 9 shows a relation between a carriage home position and the sheet reference position in the first embodiment.
Figure 10:
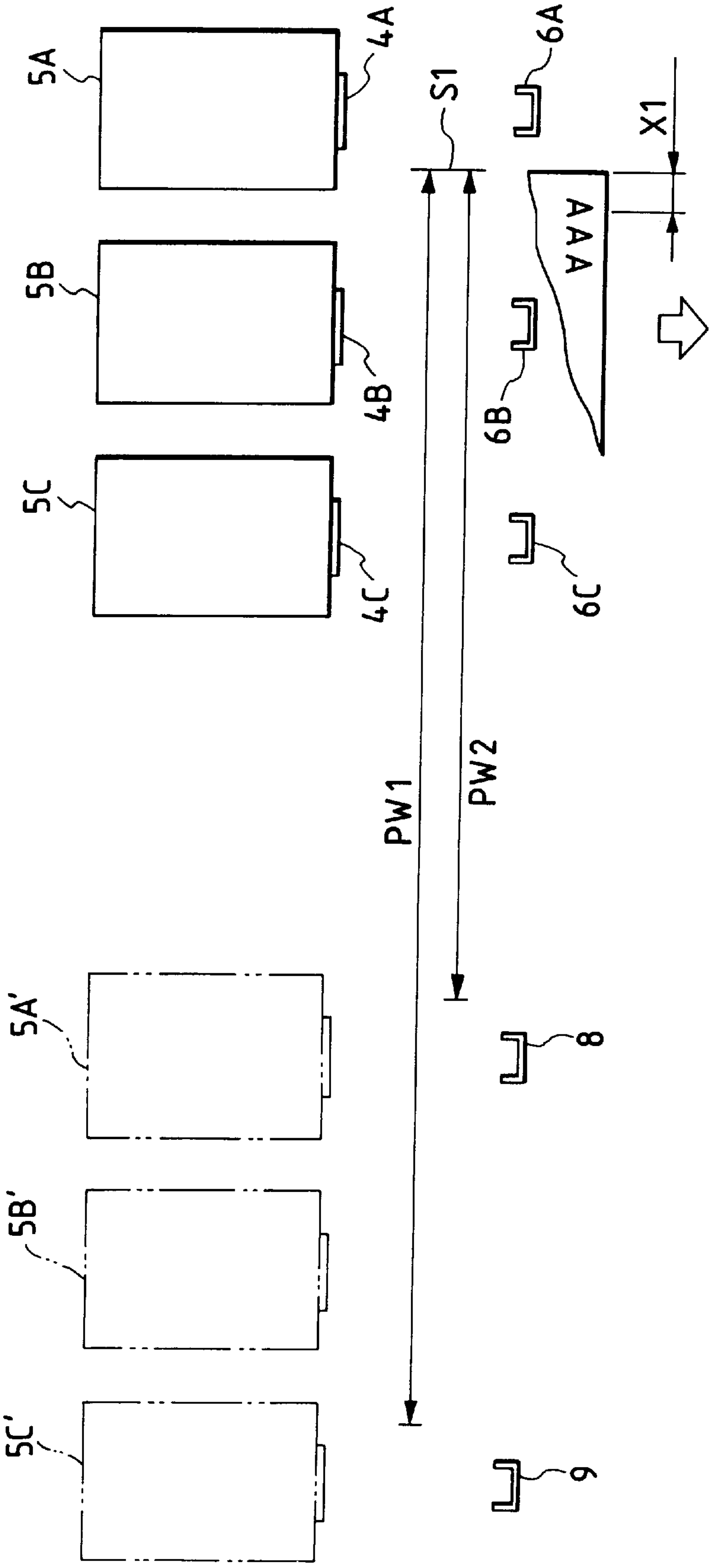
FIG. 10 shows a relation between the carriage home position and the sheet reference position in another example.
Figure 11:
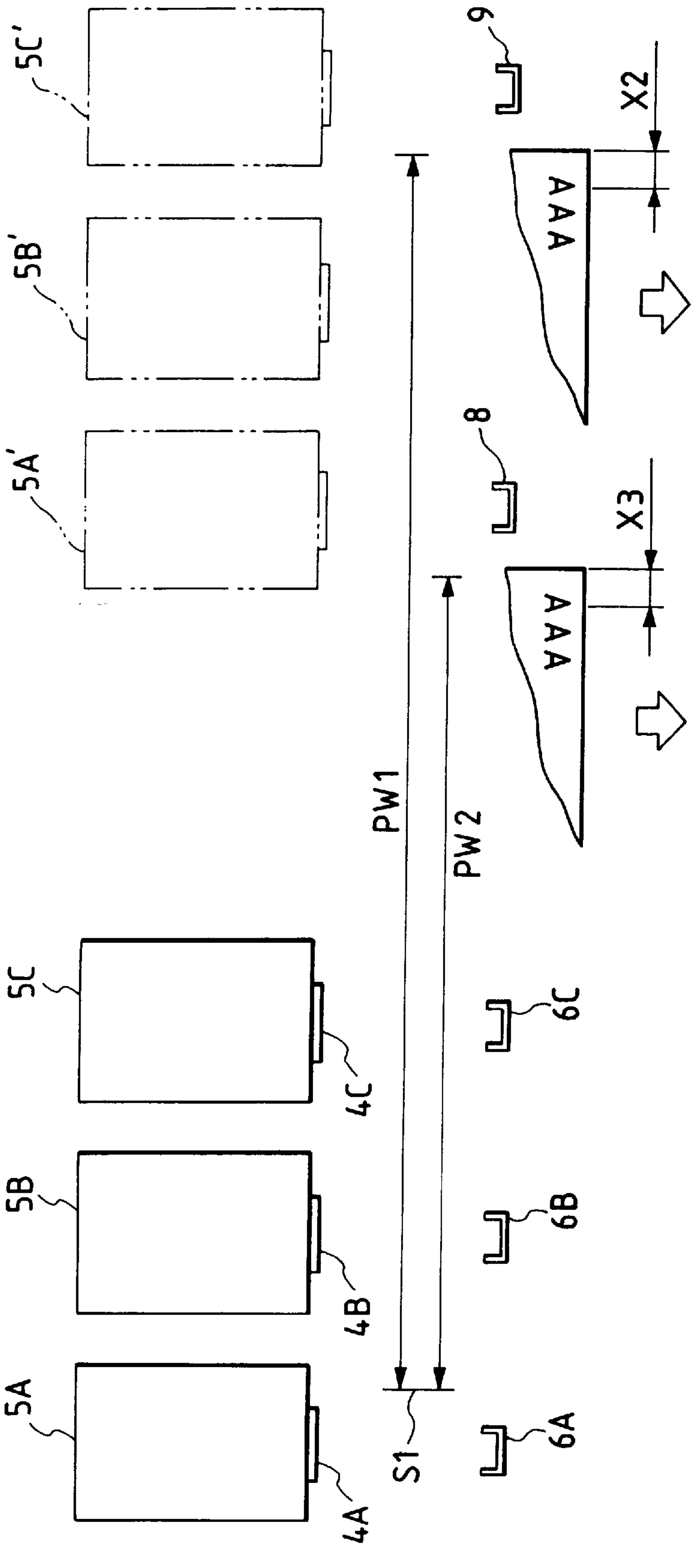
FIG. 11 shows a relation between the carriage home position and the sheet reference position in other example.
Figure 12:
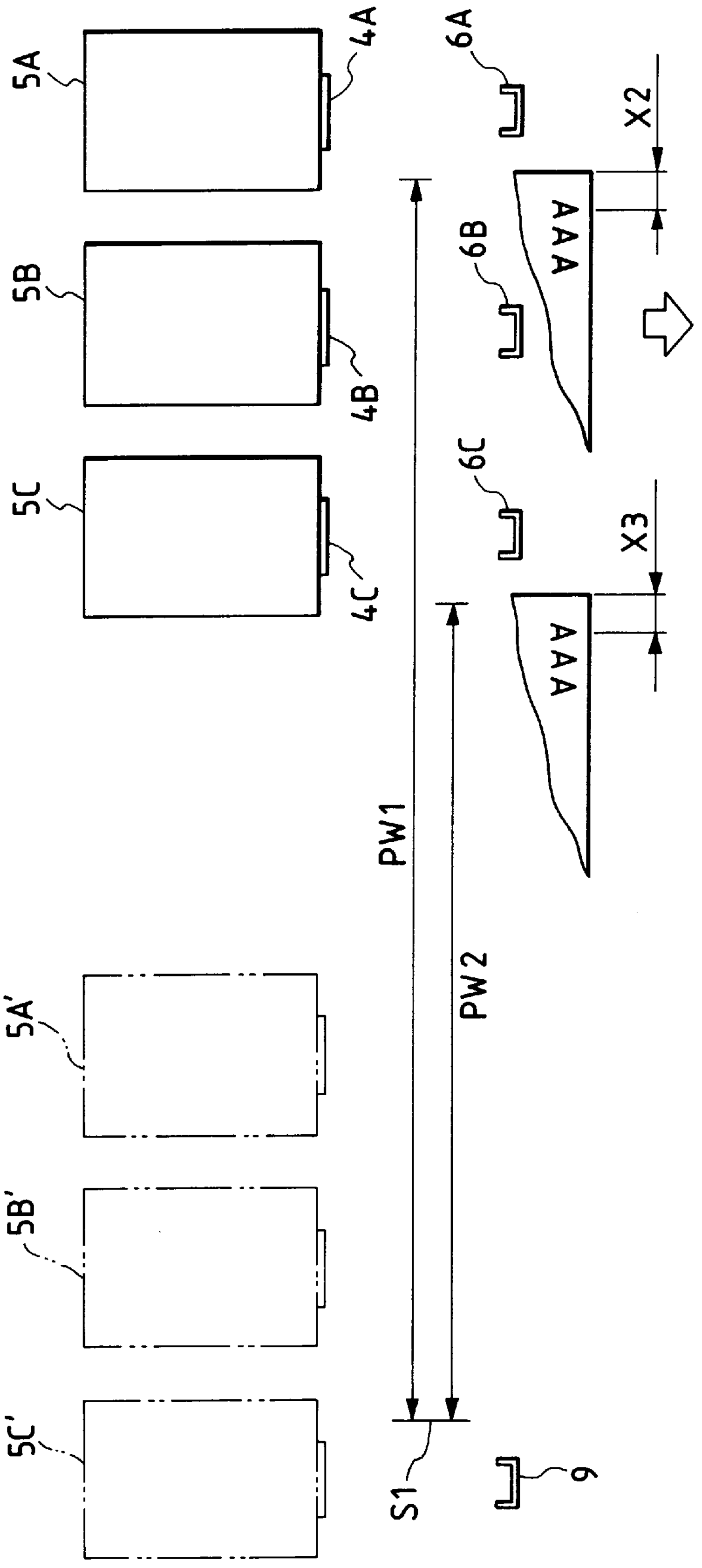
FIG. 12 shows a relation between the carriage home position and the sheet reference position in a still other example.

FIG. 9 shows a plan view of the carriage home position in accordance with the present embodiment, and FIGS. 10, 11 and 12 show plan views of different combinations of the carriage home position and the sheet feed reference. In those figures, when the recording heads 4A, 4B and 4C are positioned in the recording area on the opposite side to their home positions, they are shown by reference numerals with ['].

FIG. 9 shows the arrangement of the present embodiment. When the first sheet reference S1 is positioned on the right hand in the drawing, the carriage home position is defied on the opposite side (left hand in the drawing). In this case, as described above, the caps 6A, 6B and 6C for protecting the recording heads 4A, 4B and 4C when they are positioned at the home positions are arranged, the preliminary discharge receptacle 9 is arranged on the side of the first sheet reference, and the cap 6A and the preliminary discharge receptacle 9 are used for the preliminary discharge. The sheet is fed in a direction LF shown in the drawing and a character "A" is recorded thereon. An interval between the record end and the sheet end is shown by X1.

In an example shown in FIG. 10, the home position is set on the side of the first sheet reference relative to the example shown in FIG. 9. In FIG. 11, the first sheet reference S1 is set to the left side on the opposite side relative to the example shown in FIG. 9. In FIG. 12, the first sheet reference S1 is set on the left side on the opposite side and the home position is set to the right side on the opposite side.

A positional relationship between the first sheet reference and the home position may be represented by the combinations shown in FIGS. 9 to 12. When the first sheet reference is on the left side (the right side when the sheet is viewed in a direction to enable normal reading of the recorded result in the recording apparatus) as shown in FIGS. 11 and 12, the start position of the record is on the opposite side of the first sheet reference and a dimension X2 or X3 of a left end margin of the record includes a cut tolerance of the sheet.

For the cutting of the sheet, an allowable tolerance defined by the Japan Industrial Standard (JIS) is applied. For example, according to JIS-P0138 sheet working finish dimension, a dimension allowable tolerance for larger than 150 mm and not larger than 600 mm is ±2 mm and the A4 size width dimension of 210 mm is within the range of 208 mm to 212 mm. A dimension of a margin (left end margin) from the left end of the sheet to the start position of the record is one of factors which affect to the record quality in the recording apparatus. The dimension of the margin is a print quality reference to define the start position of the normal lateral text and the left end of the sheet and it is set as a target of the apparatus. It is usually set to approximately ±1 mm.

In this case, as shown in FIGS. 11 and 12, when the cut tolerance is overlapped to the left end margin, an error of uncertain and large value is included in the factor which determines the record quality, which is not preferable. Dimension tolerances $\Delta X_n$, in the dimension X1 in FIGS. 9 and 10 and in the dimensions X2 and X3 in FIGS. 11 and 12 have the following relation:

$$\Delta X1 \leqq \Delta X2,\ \Delta X1 \leqq \Delta X3$$

Thus, it is preferable to secure the record precision that the first sheet reference is positioned on the right side in the drawing.

In FIG. 10, the home position is provided on the side of the first sheet reference. In this case, whatever width dimension is the sheet fed, the carriage and the sheet overlap at the home position. On the other hand, in the construction of the present embodiment shown in FIG. 9, when the sheet of a small width dimension is fed, the carriage (head) is positioned beyond the sheet at the home position and the head may be broken when the jam occurs during the sheet feed. Thus, from the stand point of the head protection, it is preferable that the home position is provided on the opposite side of the sheet reference.

In FIG. 9, in addition to the number, three of caps necessary for the head protection at the home position, the preliminary discharge cap or the preliminary discharge receptacle is necessary on the opposite side. On the other hand, in the construction shown in FIG. 10, the number of caps required at the home position is three, but in order to conduct the preliminary discharge at the substantially same time interval as that in FIG. 9 in recording to the same sheet width, at least two additional preliminary discharge caps or preliminary discharge receptacle (shown by numerals 8 and 9 in FIG. 10) are required. Thus, the construction of the present embodiment shown in FIG. 9 is advantageous in terms of cost, recording speed and reliability.

In the present embodiment, since all of the recording heads may be mounted on the carriage, the head replacement operation such as complex recording head replacement is not necessary and a maintenance box to maintain the replaced recording heads is not necessary, and the maintenance and the handling are facilitated and the reliability of the apparatus is improved.

[Second Embodiment]

Figure 13:
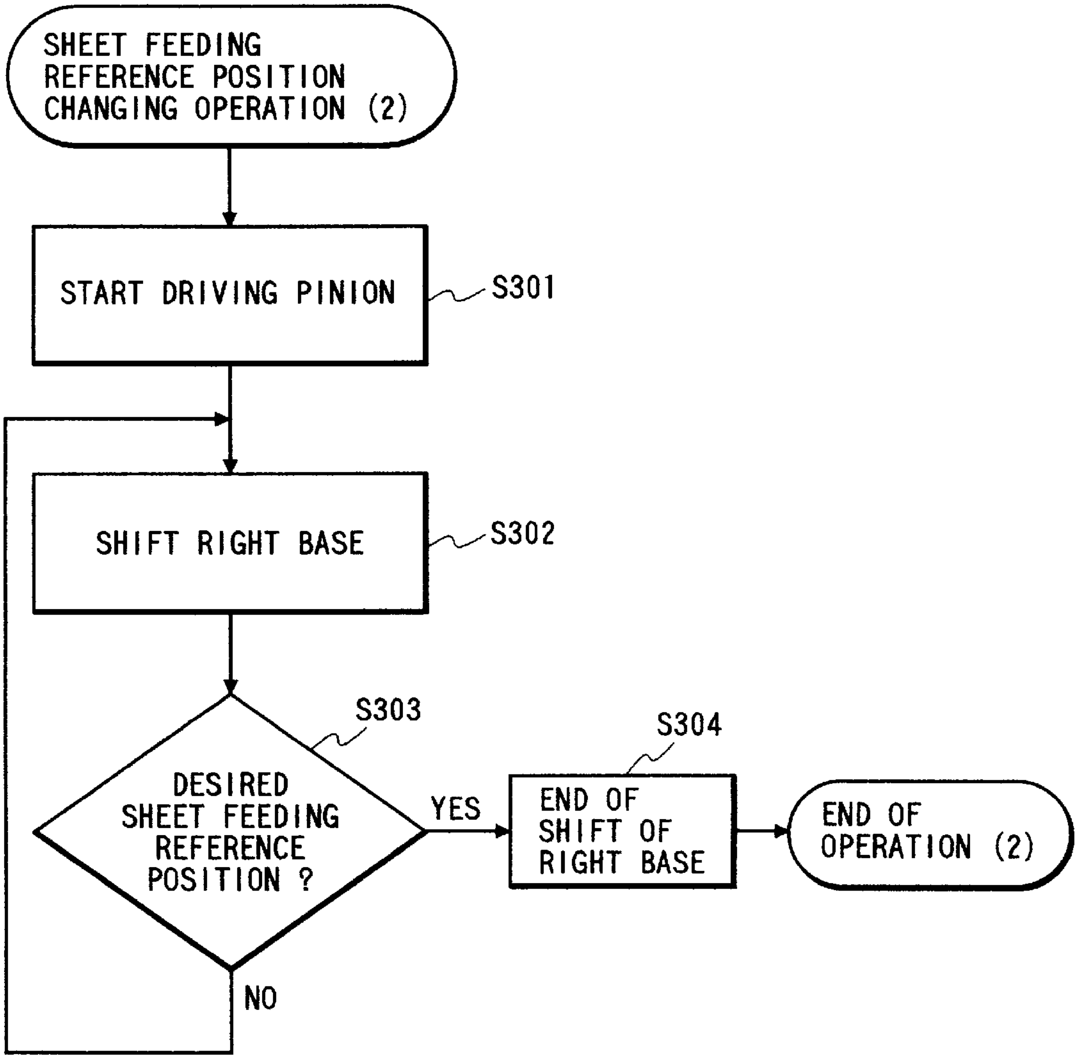
FIG. 13 shows a flow chart of the sheet feed reference switching operation in the sheet feed position switching operation of a second embodiment of the present invention.
Figure 14:
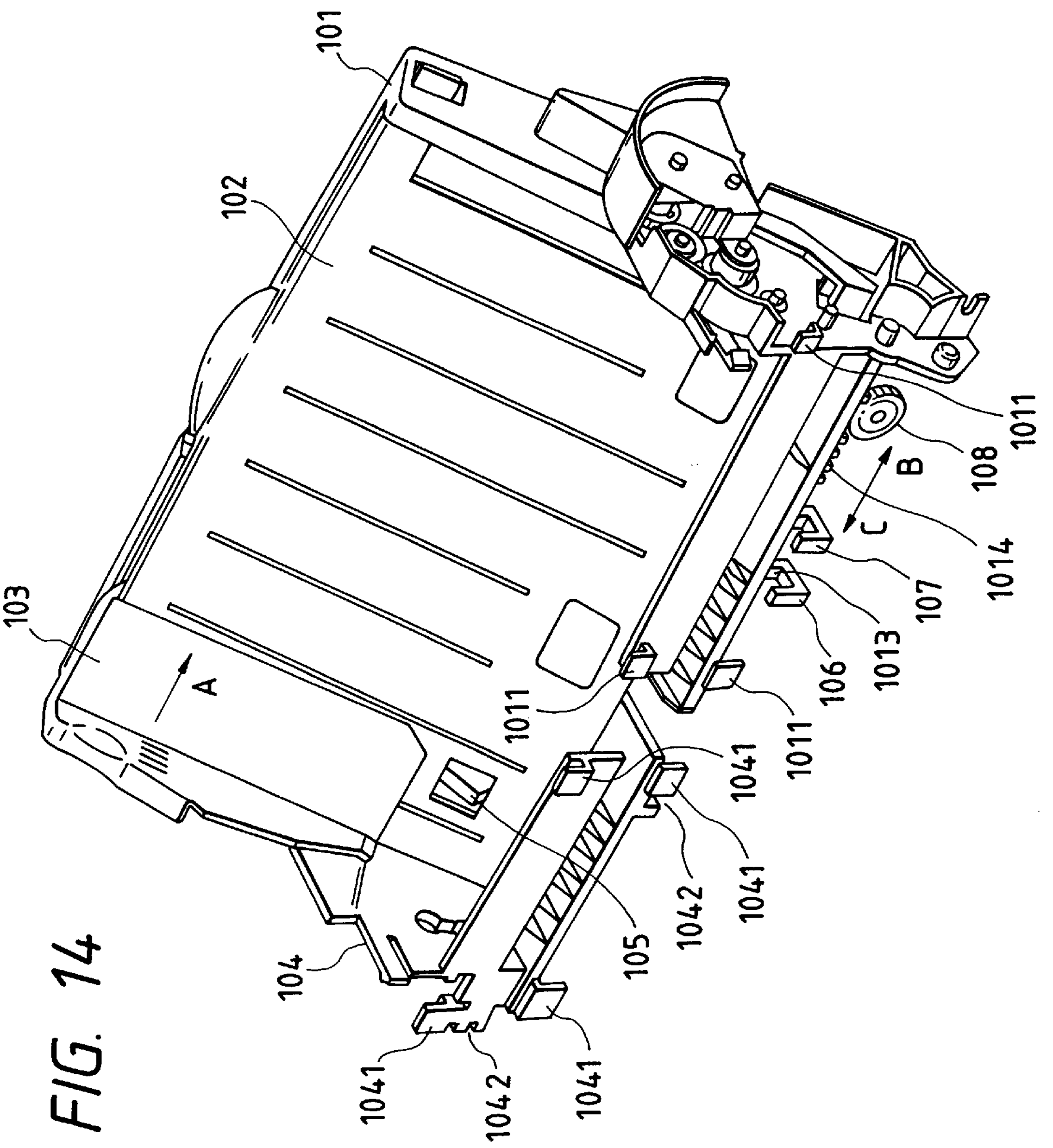
FIG. 14 shows a perspective view of the sheet feed unit of the second embodiment.

FIG. 13 shows a flow chart of another example of the sheet feed reference switching operation (S108) shown in FIG. 6. In the present embodiment, instead of the CR engagement pin 40 used in the operation of FIG. 7, the right base 101 is provided with a rack 1014 which is driven by the engagement with a pinion 108 of a separate drive source as shown in FIG. 14.

When the sheet reference switching operation of the present embodiment is started, the pinion 108 is first driven (S301) to move the entire right base 101 (S302). Then, whether the predetermined sheet reference position is reached or not is determined by the sensor 111 (S303). When the reach to the predetermined position is detected, the separate drive source is stopped (S304) and the switching operation is completed.

By this construction, when an operator selects the sheet or the print quality on the host computer, the selectable sheet sizes and print quality may be previously restricted or the state of the size of the currently loaded sheet and the sheet reference position may be displayed.

[Third Embodiment]

Figure 15:
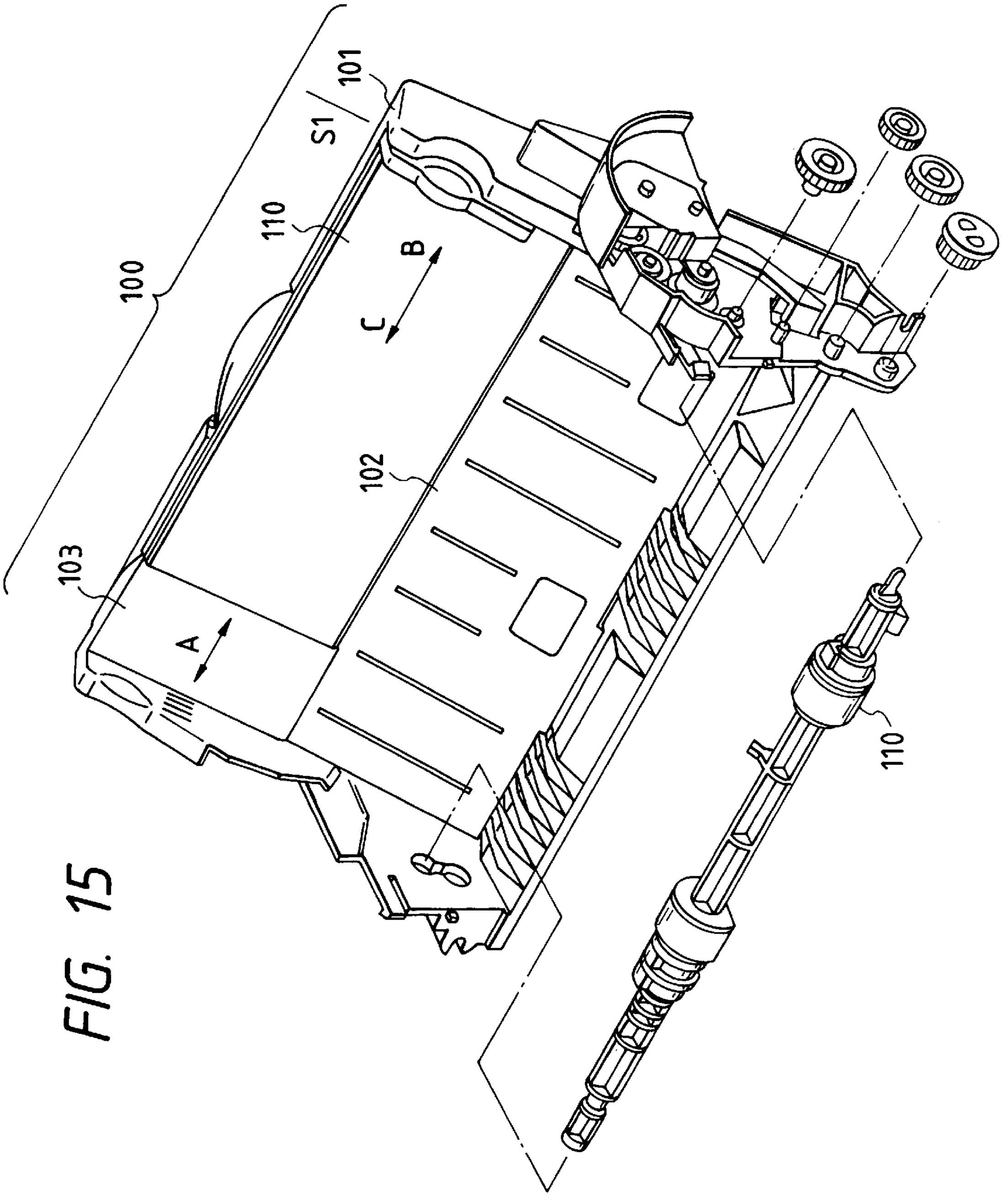
FIG. 15 shows a perspective view of the sheet feed unit of a third embodiment of the present invention.

FIG. 15 shows a perspective view of the sheet feed unit in accordance with a third embodiment of the present invention. In the first and second embodiments, the right base 101 is automatically actuated by the drive source in the apparatus, but in the present embodiment, the right base is integrally. fixed to the chaises and the right guide 110 which forms a new sheer reference is actuated by means of the operator. The right guide 110 is movably supported to the intermediate plate 102 in the directions B and C and the left guide 103 is supported movably on the right guide 110 in the directions B and C.

Figure 16:
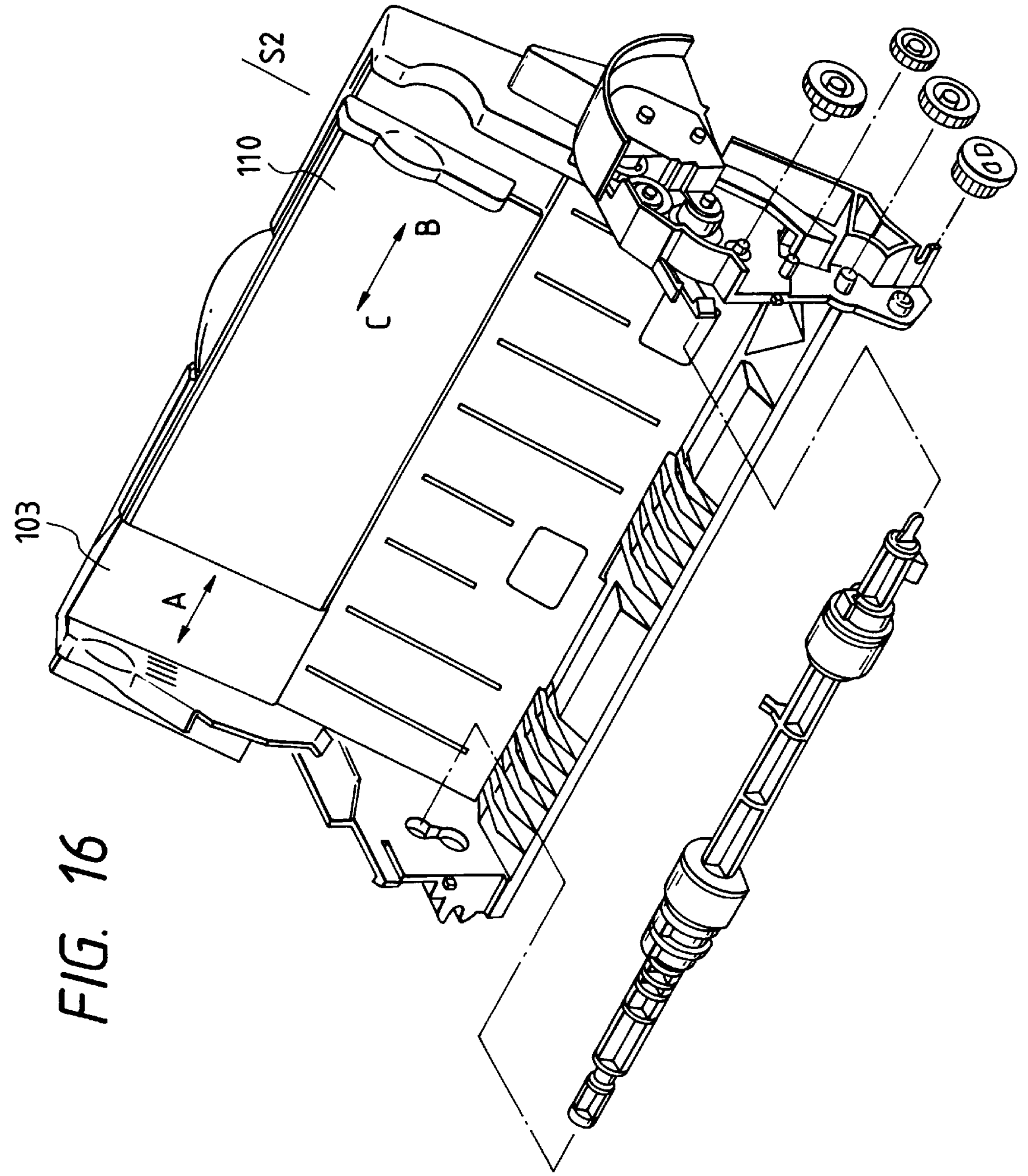
FIG. 16 shows a perspective view of the sheet feed unit of the third embodiment of the present invention.

In FIG. 15, the right guide 110 is at the position of the first sheet reference S1 and the left guide 103 is at the position corresponding to the maximum recording width. FIG. 16 shows a state in which the right guide 110 is moved in the direction C from the position shown in FIG. 15 and stopped at the position of the second sheet reference S2. At this time, the left guide 103 is movable independently from the right guide 102 but since it cannot be moved beyond the maximum recording width, it keeps the position.

Figure 17:
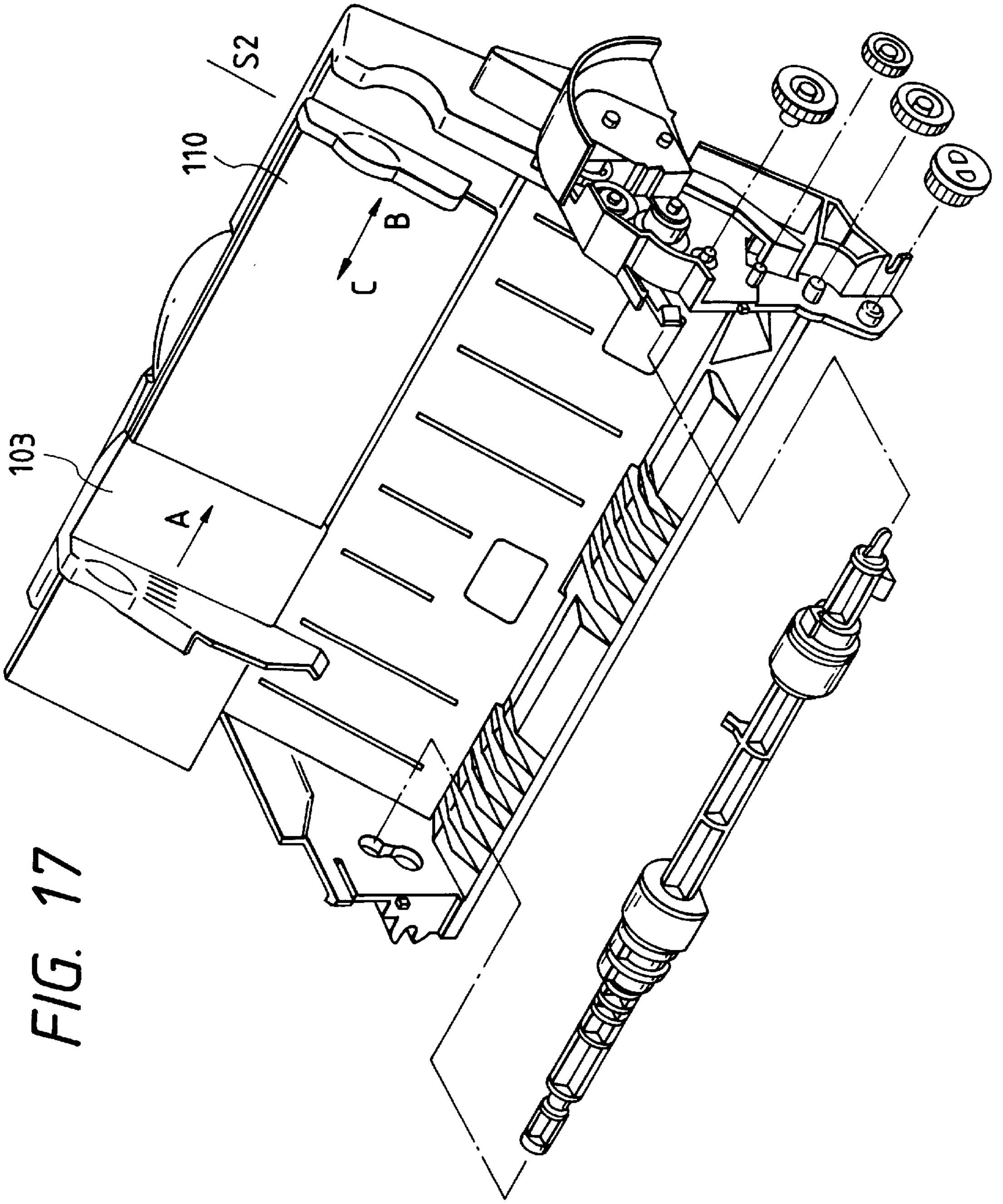
FIG. 17 shows a perspective view for illustrating an operation of the sheet feed unit of the third embodiment.

When the left guide 103 is moved in the direction A, a record may be made on the sheet of a small width by using the second sheet reference as shown in FIG. 17. When the right guide 110 is moved in the direction B in the state shown in FIG. 17, the left guide 103 follows in the direction A in the same operation.

In this manner, in accordance with the present embodiment, the first sheet reference S1 and the second sheet reference S2 may be switched by the setting of the operator without using the drive source.

[Fourth Embodiment]

Figure 18:
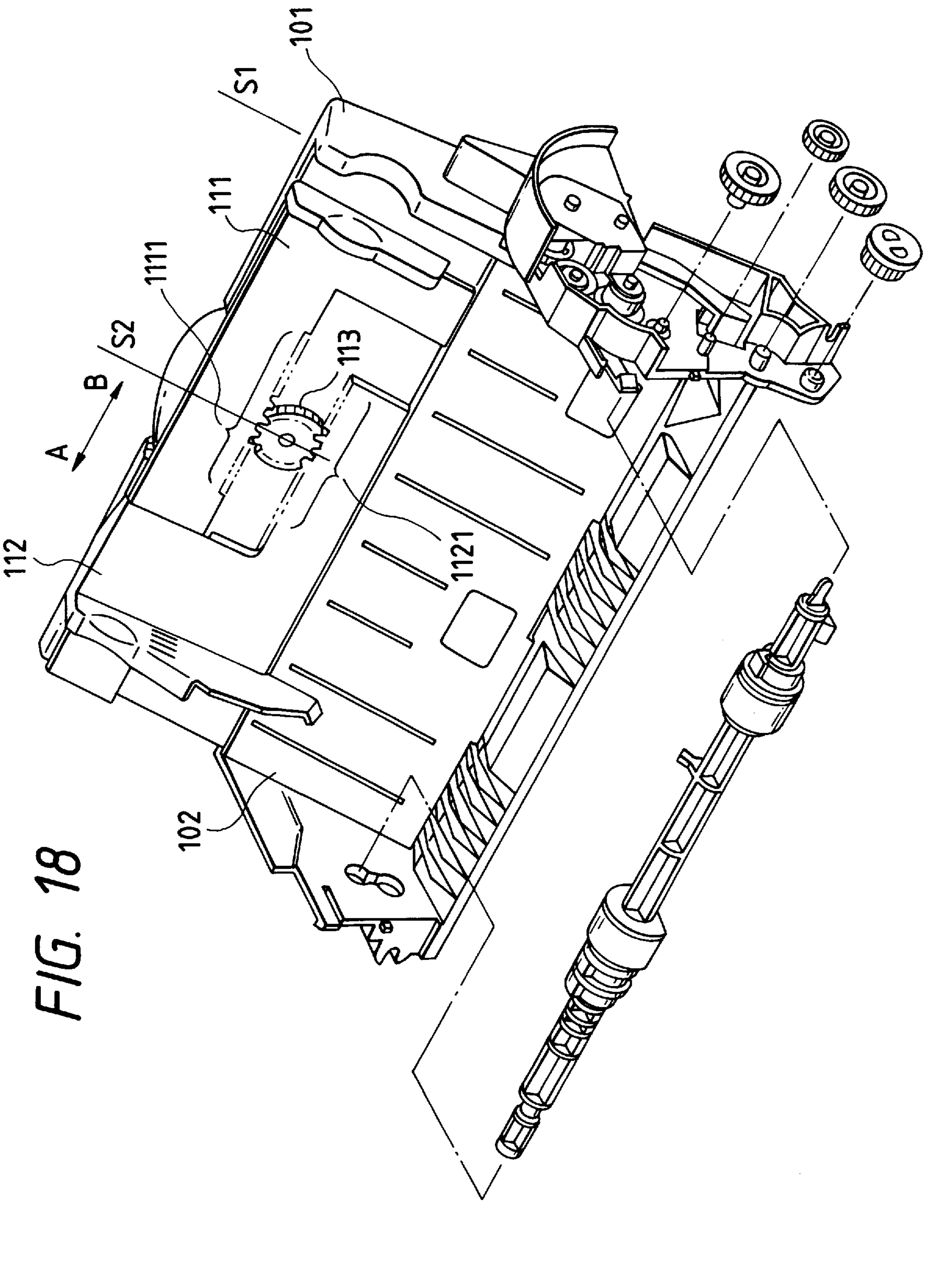
FIG. 18 shows a perspective view of the sheet feed unit of a fourth embodiment of the present invention.

FIG. 18 shows a perspective view of the sheet feed unit in accordance with a fourth embodiment of the present invention. In the present embodiment, the right guide and the left guide are linked by a gear relative to the configuration of the third embodiment. In FIG. 18, numeral 113 denotes a gear rotatably supported by the intermediate plate 102 and has teeth around an outer periphery thereof. The right guide 111 is provided with a notch and teeth to engage with the gear 113 are formed at an end 1111 of the notch. Similarly, a notch is formed in the left guide 112 and teeth to engage with the gear 113 are formed at a fixed end 1121 of the notch. By this construction, when one of the left and right guides is moved in the direction A, the gear 113 is rotated and the other is moved in the direction B. In this manner, the sheet loading of the center reference is attained by the guides which are moved symmetrically to the specific point.

The first sheet reference S1 corresponds to the maximum recording width PW1 as one side reference, and the second sheet reference S2 is the center reference and the recording width is expanded to the both side uniformly when the sheet width expands. By setting the center of the overlapping operation area of the respective heads as the second sheet reference, a recording area of a higher precision may be set at the center relative to the sheet which can be mounted on the stacker. This is effective in improving the image quality used in the scan direction double density recording by the combination of heads having gray level densities and reducing the carriage scan speed to one half.

[Fifth Embodiment]

Figure 19:
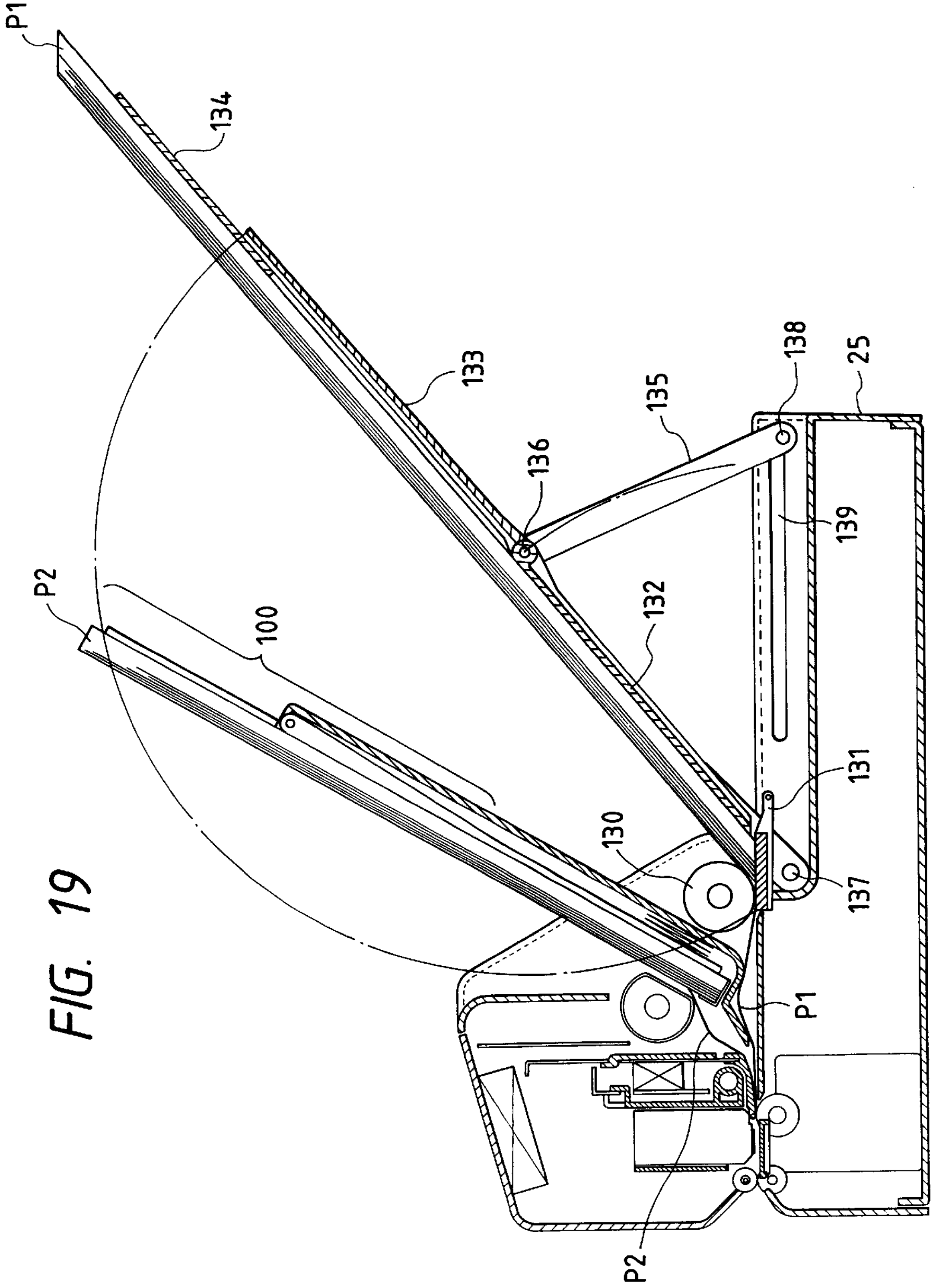
FIG. 19 shows a sectional view of the recording apparatus for illustrating the sheet feed position switching by a fifth embodiment of the present invention.

FIG. 19 shows a sectional view of the recording apparatus for illustrating the sheet feed position switching in accordance with a fifth embodiment of the present invention. The first sheet reference S1 and the second sheet reference S2 shown in the first embodiment are attained by providing two sheet feed paths.

In FIG. 19, the sheet which passes through the same path as the sheet feed path in FIG. 3 is represented by P2, and the sheet feed unit 100 having the second sheet reference set therein is referred to as a second sheet feed path. A new first sheet feed path is provided behind the above path. The sheet P1 passes through the first sheet feed path and the first sheet reference is set therein. In the first sheet feed path, the stacked sheet P1 is separated and fed by the sheet feed roller 130 and a separation member 131 rotatably supported by the bottom case 25. The sheet feed base has a tray 132 rotatably supported by the bottom case 25 at a support point 137, a tray 133 rotatably supported at a support point 136 and an extended tray 134 extendably supported by the tray 133. Further, a support member 135 having a support point 138 which is slidably movable in a groove 139 on the bottom case 25 for supporting entire weight rotatably engaged with the support 136 is provided.

Figure 20:
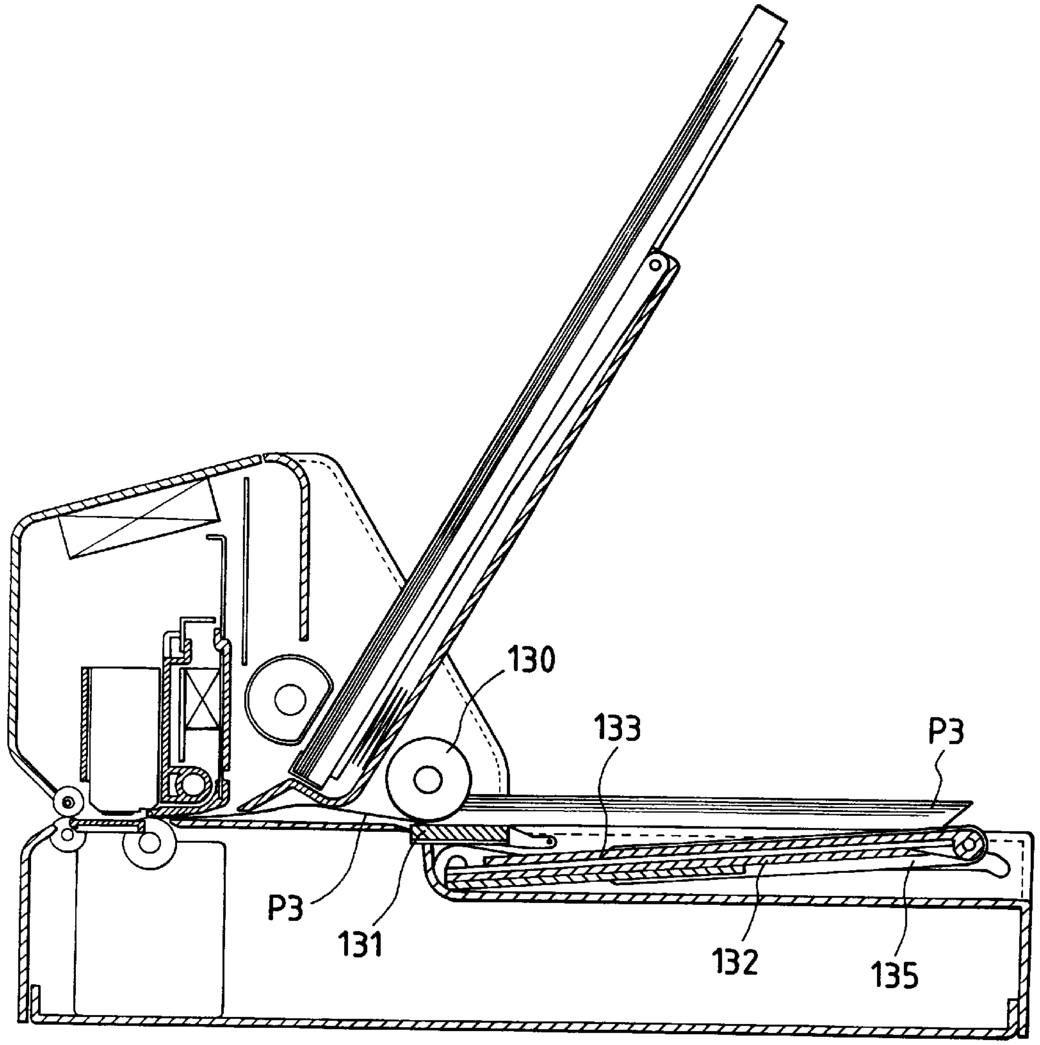
FIG. 20 shows a sectional view of the recording apparatus for illustrating the sheet feed position switching by the fifth embodiment.

FIG. 20 shows a state of the components in the second feed path folded from the state FIG. 19. The extended tray 134 is accommodated in the tray 133 as the slide, the tray 133 overlaps with the tray 132 and centered at the support point 136, and the tray 132 rotates around the support point 137 and is folded with the support member 135 and accommodated in a recess of the bottom case 25. Since the back plane of the tray 133 is now substantially planar to allow the mounting of the sheet P3, the substantially linear third sheet feed path which is separated and fed by the separation member 131 can be formed.

In the present embodiment, the first sheet reference=the first sheet feed path and the second sheet reference=the second sheet feed path, and the setting by the operator is facilitated and the visual check is improved. Since the setting is made such that the second sheet feed path (third sheet feed path) has the maximum recording width PW1, the front side has the sheet of a small size and the operability and the visual check in stacking the sheets are improved.

The difference between the apparatus width and the maximum recording width is reduced by the divided recording, but in order to maintain this advantage, it is difficult to arrange the unit other than the sheet feed unit in the width direction. Even in such a case, in the first sheet feed path, spaces corresponding to the shift are created on the opposite sides of the apparatus and they may be used for arranging the carriage drive motor and arranging an interface connector. In this manner, a space efficiency is improved.

Further, sheets not used may be stacked in one of the paths and the operability is improved.

Further, by the folding construction, the linear sheet feed path may be formed, which is preferable to the feed of thick sheets or the recording medium of high rigidity.

While the construction of the sheet feed unit 100 is used in the present embodiment, the operability such as the supply of the sheets is improved by using cassette sheet feed and the present invention is made more effective.

What is claimed is:

1. A recording apparatus for recording on a recording medium by using a plurality of recording heads arranged at a predetermined interval in a scan direction across a recording area, said plurality of recording heads capable of recording in at least one common color, said apparatus comprising:

scan means for causing said recording heads to scan corresponding divided recording areas;

record control means for causing at least one of said recording heads to record in at least first and second record modes, the first record mode to record at least one of the corresponding divided recording areas, and the second record mode to record an overlapping recording area in which said recording heads record in an overlapped manner by cooperation of at least two recording heads, when said scan means causes said recording heads to scan the corresponding divided recording areas; and definition means for defining positions of a recording medium at a plurality of reference positions, wherein one of said plurality of reference positions corresponds to the overlapping recording area.

2. A recording apparatus according to claim 1 wherein home positions of said recording heads scanned by said scan means are arranged in a range in which the recording medium positioned by said definition means is present.

3. A recording apparatus according to claim 2 wherein the home positions are arranged on the opposite side to the reference positions in the scan area by said scan means.

4. A recording apparatus according to claim 2 wherein the reference positions are arranged on the side of the start of record of the recording medium recorded by said recording heads.

5. A recording apparatus according to claim 1 wherein said recording heads generate air bubbles in inks by utilizing thermal energy to discharge inks by a pressure of the air bubbles.

6. A recording apparatus according to claim 5 wherein means for maintaining said recording heads are provided at the home positions.

7. A recording apparatus according to claim 6 wherein said maintenance means includes caps.

8. A recording apparatus according to claim 1 wherein said scan means has a carriage for mounting said recording heads and scans by moving said carriage in the direction of scan.

9. A recording apparatus according to claim 1 wherein said definition means includes a definition member, and said definition means is arranged movably.

10. A recording apparatus according to claim 9 further comprising drive means for driving said definition member.

11. A recording apparatus according to claim 10 wherein said definition means includes hold means for holding said recording medium for feeding to said recording area, said recording apparatus further comprising:

detection means for determining whether said hold means holds the recording medium having a maximum holdable width or not; and control means for inhibiting the movement of said definition member by said drive means when the holding of the recording medium of the maximum holdable width by said hold means is detected.

12. A recording apparatus according to claim 1 wherein at least one of images generated in the recording areas by said record control means has a different record mode from those of other images.

13. A recording apparatus according to claim 1 wherein said recording heads record on the recording medium in a plurality of colors.

14. An apparatus according to claim 1, wherein each interval of said plurality of reference positions is not greater than an arrangement pitch of said plurality of recording heads.

15. A recording apparatus for recording on a recording medium by using a plurality of recording heads arranged at a predetermined interval in a scan direction across a recording area, comprising:

scan means for causing said recording heads to scan corresponding divided recording areas;

record control means for causing at least two of said recording heads to record in at least first and second record modes, the first record mode to record an entire recording area by shared recording in the divided recording areas, and the second record mode to record an overlapping recording area in which said recording heads record in an overlapped manner by cooperation of at least two recording heads, when said scan means causes said recording heads to scan the corresponding divided recording areas; and definition means for defining positions of a recording medium at a plurality of reference positions provided for the entire recording area in which recording is made and for the overlapping recording area.

16. A recording apparatus according to claim 1 wherein said definition means includes a definition member, and said definition member is arranged movably.

17. A recording apparatus according to claim 16 wherein said definition means is arranged to be movable by an interval between said reference positions.

18. A recording apparatus according to claim 17 further comprising feed path means for forming a plurality of recording medium feed paths for said reference positions.

19. A recording apparatus according to claim 18 wherein the path for feeding the recording medium of a maximum width is arranged bottommost to other paths in said recording medium feed paths.

20. A recording apparatus according to claim 15 wherein a one-side reference and a center reference are arranged for the recording medium width at the reference position of said recording medium.

21. A recording apparatus according to claim 15 further comprising feed path means for forming a plurality of feed paths for said reference positions.

22. A recording apparatus according to claim 21 wherein the path for feeding the recording medium of a maximum width is arranged bottommost to other paths in said recording medium feed paths.

23. A recording apparatus for recording on a recording medium by using a plurality of recording heads arranged at a predetermined interval in a scan direction across a recording area, said plurality of recording heads capable of recording in at least one common color, said apparatus comprising:

scan means for causing said recording heads to scan corresponding divided recording areas;

record control means for causing at least two of said recording heads to record in at least first and second modes, the first record mode to record an entire recording area by shared recording in the divided recording areas, and the second record mode to record an overlapping recording area in which said recording heads record in an overlapped manner by cooperation of at least two recording heads, when said scan means causes said recording heads to scan the corresponding divided recording areas, so that the entire recording area is recordable by all of the plurality of recording heads in the common color; and definition means for defining positions of a recording medium at a plurality of reference positions provided for the entire recording area in which recording is made and for the overlapping recording area.

24. An apparatus according to claim 15, wherein each interval of said plurality of reference positions is not greater than an arrangement pitch of said plurality of recording heads.

25. An apparatus according to claim 23, wherein each interval of said plurality of reference positions is not greater than an arrangement pitch of said plurality of recording heads.

26. A recording apparatus according to claim 23, wherein a one-side reference and a center reference are arranged for the recording medium width at the reference position of said recording medium.

27. A recording apparatus according to claim 23, further comprising feed path means for forming a plurality of feed paths for said reference positions.

28. A recording apparatus according to claim 27, wherein the path for feeding the recording medium of a maximum width is arranged bottommost to other paths in said recording medium fee paths.

* * * * *

UNITED STATES PATENT AND TRADEMARK OFFICE

CERTIFICATE OF CORRECTION

PATENT NO. : 6,025,928

DATED : February 15, 2000

INVENTORS : M. Takemura, et al.

It is certified that error appears in the above-identified patent and that said Letters Patent is hereby corrected as shown below:

COLUMN 1

Line 10, "head" should read --heads--.
Line 29, "apparatus" should read --apparatuses--.
Line 36, "generates" should read --generate--.

COLUMN 2

Line 7, "limitation." should read --limitations.--.
Line 54, "areas" should read --areas of--.

COLUMN 3

Line 29, "period." should read --periods.--.
Line 35, "time" should read --times--.

COLUMN 5

Line 19, "other" should read --another--.
Line 21, "a still other" should read --still another--.

UNITED STATES PATENT AND TRADEMARK OFFICE

CERTIFICATE OF CORRECTION

PATENT NO. : 6,025,928

DATED : February 15, 2000

INVENTORS : M. Takemura, et al.

It is certified that error appears in the above-identified patent and that said Letters Patent is hereby corrected as shown below:

COLUMN 7

Line 28, "interfere" should read --interfere with--.
Line 32, "to" should read --on--.
Line 49, "for discharging" should read --to discharge--.
Line 63, "by" (second occurrence) should read --of--.

COLUMN 8

Line 2, "scans" should read --scan--.
Line 4, "same" should read --the same--.
Line 40, "from" should read --form--.

COLUMN 9

Line 57, "thor-" should read --thro- --

COLUMN 10

Line 1, "detail" should read --details--.
Line 46, "is protruded" should read --protrudes--.

UNITED STATES PATENT AND TRADEMARK OFFICE

CERTIFICATE OF CORRECTION

PATENT NO. : 6,025,928

DATED : February 15, 2000

INVENTORS : M. Takemura, et al.

It is certified that error appears in the above-identified patent and that said Letters Patent is hereby corrected as shown below:

COLUMN 10

Line 63, "hope" should read --home--.

COLUMN 11

Line 8, "defied" should read --defined--.
Line 43, "of" should read --of the-- and "affect to" should read --affects--.

COLUMN 12

Line 4, "caps" should read --the caps--.
Line 11, "to" should read --on--.
Line 51, "integrally." should read --integrally--.

COLUMN 13

Line 30, "side" should read --sides--.

UNITED STATES PATENT AND TRADEMARK OFFICE

CERTIFICATE OF CORRECTION

PATENT NO. : 6,025,928

DATED : February 15, 2000

INVENTORS : M. Takemura, et al.

It is certified that error appears in the above-identified patent and that said Letters Patent is hereby corrected as shown below:

COLUMN 15

Line 58, "claim 1" should read --claim 15--.

COLUMN 16

Line 61, "fee" should read --feed--.

Signed and Sealed this

Twenty-seventh Day of March, 2001

Attest:

Nicholas P. Godici

NICHOLAS P. GODICI

*Attesting Officer*

*Acting Director of the United States Patent and Trademark Office*